(12) United States Patent
Wang et al.

(10) Patent No.: US 11,375,369 B2
(45) Date of Patent: Jun. 28, 2022

(54) MESSAGE AUTHENTICATION METHOD AND COMMUNICATION METHOD OF COMMUNICATION NETWORK SYSTEM, AND COMMUNICATION NETWORK SYSTEM

(71) Applicant: DATANG MOBILE COMMUNICATIONS EQUIPMENT CO., LTD, Beijing (CN)

(72) Inventors: Jian Wang, Beijing (CN); Nan Jiang, Beijing (CN); Xiaowei Lu, Beijing (CN); Juan Du, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 205 days.

(21) Appl. No.: 16/770,621

(22) PCT Filed: Dec. 7, 2018

(86) PCT No.: PCT/CN2018/119925
§ 371 (c)(1),
(2) Date: Jun. 8, 2020

(87) PCT Pub. No.: WO2019/110018
PCT Pub. Date: Jun. 13, 2019

(65) Prior Publication Data
US 2020/0314647 A1 Oct. 1, 2020

(30) Foreign Application Priority Data
Dec. 8, 2017 (CN) .......................... 201711298755.4

(51) Int. Cl.
*H04W 12/06* (2021.01)
*H04L 9/08* (2006.01)
(Continued)

(52) U.S. Cl.
CPC .......... *H04W 12/06* (2013.01); *H04L 9/0825* (2013.01); *H04L 9/0869* (2013.01);
(Continued)

(58) Field of Classification Search
CPC ............................. H04W 12/06; H04L 9/3247
See application file for complete search history.

(56) References Cited

U.S. PATENT DOCUMENTS

2013/0159522 A1* 6/2013 Hakola .................. H04L 63/10
 709/225
2015/0052580 A1* 2/2015 Delsol ..................... H04L 63/20
 455/509

(Continued)

FOREIGN PATENT DOCUMENTS

CN 103391545 A 11/2013
CN 103731826 A 4/2014
(Continued)

OTHER PUBLICATIONS

3rd Generation Partnership Project, Study on Security issues to support Proximity Services, Feb. 28, 2016.
(Continued)

*Primary Examiner* — David J Pearson
(74) *Attorney, Agent, or Firm* — Bayramoglu Law Offices LLC

(57) ABSTRACT

A message authentication and communication method for a communication network system comprises: the access control device receiving a communication establishment request sent by the first mobile apparatus; the access control device sending a communication mutual authentication request to the authentication server in response to the communication establishment request; the access control device receiving a mutual authentication response message sent by the authentication server in response to the communication mutual
(Continued)

authentication request; the access control device authenticating the mutual authentication response message; when the mutual authentication response message is authenticated successfully, the access control device sending a mutual authentication message to the first mobile apparatus. And the hash chain mechanism and the access control device are used in conjunction with the authentication server to implement the distribution and decentralization of authentication functions, thereby reducing the load of the authentication server and improving the efficiency of authentication.

17 Claims, 8 Drawing Sheets

(51) Int. Cl.
*H04L 9/32* (2006.01)
*H04W 12/08* (2021.01)
*H04W 12/033* (2021.01)
*H04W 12/041* (2021.01)
*H04W 12/0431* (2021.01)
*H04L 9/40* (2022.01)

(52) U.S. Cl.
CPC ......... *H04L 9/3247* (2013.01); *H04W 12/033* (2021.01); *H04W 12/041* (2021.01); *H04W 12/0431* (2021.01); *H04W 12/08* (2013.01); *H04L 63/0869* (2013.01)

(56) References Cited

U.S. PATENT DOCUMENTS

| | | | |
|---|---|---|---|
| 2015/0172061 A1 | 6/2015 | Lee et al. | |
| 2016/0065538 A1 | 3/2016 | Hakola et al. | |
| 2016/0295406 A1* | 10/2016 | Agiwal | H04W 12/041 |
| 2018/0115539 A1* | 4/2018 | Muhanna | H04W 88/02 |
| 2018/0376318 A1* | 12/2018 | Wang | H04L 63/0869 |

FOREIGN PATENT DOCUMENTS

| | | |
|---|---|---|
| CN | 104798432 A | 7/2015 |
| CN | 105706390 A | 6/2016 |
| CN | 108521875 A | 9/2018 |
| EP | 2832127 A1 | 2/2015 |
| WO | 2017107143 A1 | 6/2017 |

OTHER PUBLICATIONS

Mingjun Wang,"UAKA-D2D: Universal Authentication and Key Agreement Protocol in D2D Communications", May 23, 2017, DOI 10.1007/s11036-017-0870-5.

"3rd Generation Partnership Project; Technical Specification Group Services and System Aspects; Study on Security Bsues to support Proximity Services (ProSe) (Release)", 3GPP Standard; 3GPP TR 33.833, 3 rd Generation Partnership Project (3GPP), Mobile Competence Centre; 650, Route Des Lucioles; F-06921 Sophia-Antipolis Cedex; France, vol. SA WG3, No. V1.8.0, Nov. 24, 2016 (Nov. 24, 2016) pp. 1-227, XP051229832, [retrieved on Nov. 24, 2016] paragraph [8.2 2.2 ].

* cited by examiner

| the second mobile apparatus authenticating an apparatus mutual authentication request sent by the first mobile apparatus with the second authentication key | ─ 401 |

| when the apparatus mutual authentication request is authenticated successfully, the second mobile apparatus and the first mobile apparatus communicating with each other | ─ 402 |

FIG 6

MESSAGE AUTHENTICATION METHOD AND COMMUNICATION METHOD OF COMMUNICATION NETWORK SYSTEM, AND COMMUNICATION NETWORK SYSTEM

CROSS REFERENCE TO THE RELATED APPLICATIONS

This application is the national phase entry of International Application PCT/CN2018/119925, filed on Dec. 7, 2018, which is based upon and claims priority to Chinese Patent Application No. 201711298755.4, filed to State Intellectual Property Office of the P.R.C. on Dec. 8, 2017, and titled "Message verification method of communication network system, communication method and communication network system", the entire contents of which are incorporated herein by reference.

TECHNICAL FIELD

The present application relates to the technical field of communication, and more particularly relates to a message authentication method and communication method of communication network system, communication network system and device.

BACKGROUND

In the 5G (the 5th Generation mobile communication technology) network, there are some communication methods such as D2D (Device to Device) communication and multi-hop connection communication, which can achieve direct communication between mobile devices. The above-mentioned communication method is complementary to the traditional communication method in which the mobile device is connected to the base station, thereby improving the transmission rate between mobile devices and reducing the end-to-end delay.

However, how to implement mutual authentication between mobile devices is a key issue to ensure communication security between mobile devices; only when mobile devices participating in communication can mutually authenticate each other, a communication trust relationship can be established, thereby avoiding communication connections with malicious devices, to reduce the risk to mobile devices.

The existing device mutual authentication protocol is a three-way handshake authentication protocol based on the public key cryptosystem. The distribution and authentication of the main digital certificate requires a certain system overhead, and the calculation speed of the asymmetric cryptographic algorithm to achieve signature/signature authentication and encryption and decryption is faster than the calculation speed of using the symmetric cryptographic algorithm, and the implementation process of the entire protocol scheme is expensive, which causes the problem of low efficiency and long delay of authentication between mobile devices. Therefore, a mutual authentication method between mobile devices which has lightweight authentication with high efficiency is required in the 5G network.

SUMMARY

Embodiments of the present application provide a message authentication method of a communication network system, a communication method of the communication network system, an authentication server, an access control device, a first mobile apparatus and a second mobile apparatus, and the corresponding communication network system, to solve a problem of low efficiency and long delay of authentication between mobile devices, result from the large overhead in the implementation process of the existing apparatus mutual authentication protocol.

In order to solve the foregoing technical problem, the embodiment of the present application discloses a message authentication method of a communication network system, the communication network system comprises an authentication server, an access control device and multiple a plurality of mobile apparatuses, the multiple mobile apparatuses comprise a first mobile apparatus and a second mobile apparatus, wherein the method comprising:

the access control device receiving a communication establishment request sent by the first mobile apparatus;

the access control device sending a communication mutual authentication request to the authentication server in response to the communication establishment request;

the access control device receiving a mutual authentication response message sent by the authentication server in response to the communication mutual authentication request;

the access control device authenticating the mutual authentication response message; and when the mutual authentication response message is authenticated successfully, the access control device sending a mutual authentication message to the first mobile apparatus.

Optionally, the mutual authentication response message comprises a first initial authentication key encrypted by a public key of the access control device, a second initial authentication key encrypted by the public key of the access control device, an identification number of the authentication server, a random number $r_s$, a message sequence number and a first message authentication information; wherein the first message authentication information comprises a first characteristic hash value and a first digital signature formed by encrypting the first characteristic hash value with a private key of the authentication server; the first characteristic hash value is obtained by hashing an input of the first initial authentication key, the second initial authentication key, the identification number of the authentication server, the random number $r_s$ and the message sequence number;

the step of the access control device authenticating the mutual authentication response message comprises:

the access control device authenticating the first digital signature of the first message authentication information with a public key of the authentication server;

when the first message authentication information is authenticated successfully, the access control device decrypting the first initial authentication key encrypted by a public key of the access control device with a private key, and acquiring a decrypted first initial authentication key;

the access control device decrypting the second initial authentication key encrypted by the public key of the access control device with the private key, and acquiring a decrypted second initial authentication key;

the access control device calculating hash value obtained by hashing an input of the decrypted first initial authentication key, the decrypted second initial authentication key, the identification number of the authentication server, the random number $r_s$ and the message sequence number, and acquiring a second characteristic hash value;

the access control device determining whether the first characteristic hash value is consistent with the second characteristic hash value;

when the first characteristic hash value is consistent with the second characteristic hash value, the access control device determining that the mutual authentication response message is authenticated successfully.

The embodiment of the present application further disclosures a message authentication method of the communication network system, the communication network system comprises an authentication server and an access control device, the method comprising:

the authentication server receiving a communication mutual authentication request sent by the access control device;

the authentication server authenticating the communication mutual authentication request;

when the communication mutual authentication request is authenticated successfully, the authentication server sending a mutual authentication response message to the access control device.

Optionally, the communication mutual authentication request comprises a sequence number of a first mobile apparatus, a sequence number of a second mobile apparatus, a message sequence number, an identification number of the access control device and a second message authentication information; the second message authentication information comprises a third characteristic hash value and a second digital signature formed by encrypting the third characteristic hash value with a private key of the access control device; the third characteristic hash value is obtained by hashing an input of the sequence number of the first mobile apparatus, the sequence number of the second mobile apparatus, the message sequence number and the identification number of the access control device;

the step of the authentication server authenticating the communication mutual authentication request comprises:

the authentication server authenticating the second digital signature of the second message authentication information with a public key of the access control device;

when the second message authentication information is authenticated successfully, the authentication server calculating hash value obtained by hashing the input of the sequence number of the first mobile apparatus, the sequence number of the second mobile apparatus, the message sequence number and the identification number of the access control device, and acquiring a fourth characteristic hash value;

the authentication server determining whether the third characteristic hash value is consistent with the fourth characteristic hash value;

when the third characteristic hash value is consistent with the fourth characteristic hash value, the authentication server determining that the communication mutual authentication request is authenticated successfully.

The embodiment of the present application further disclosures a communication method of a communication network system, the communication network system comprises an authentication server, an access control device and a plurality of mobile apparatuses, the mobile apparatuses comprise a first mobile apparatus and a second mobile apparatus, the first mobile apparatus stores a first authentication key; the method comprising:

when a mutual authentication response message is authenticated successfully, the first mobile apparatus receiving a mutual authentication message sent by the access control device;

the first mobile apparatus authenticating the mutual authentication message with the first authentication key;

when the mutual authentication message is authenticated successfully, the first mobile apparatus sending an apparatus mutual authentication request to the second mobile apparatus;

the first mobile apparatus receiving an apparatus mutual authentication response message sent by the second mobile apparatus in response to the apparatus mutual authentication request;

the first mobile apparatus authenticating the apparatus mutual authentication response message with the first authentication key;

when the apparatus mutual authentication response message is authenticated successfully, the first mobile apparatus and the second mobile apparatus communicating with each other.

Optionally, the mutual authentication message comprises a message formed by encrypting a second authentication key and a random number $r_a$ with the first authentication key, a message formed by encrypting the first authentication key and the random number $r_a$ with the second authentication key, the random number $r_a$, a random number $r_s$, an identification number of an access centralized control module, a message sequence number and a third message authentication information; wherein, the third message authentication information comprises a message formed by encrypting a fifth characteristic hash value with the first authentication key; the fifth characteristic hash value is obtained by hashing an input of the message formed by encrypting the second authentication key and the random number $r_a$ with the first authentication key, the message formed by encrypting the first authentication key and the random number $r_a$ with the second authentication key, the random number $r_a$, the random number $r_s$, the identification number of the access centralized control module and the message sequence number;

the step of the first mobile apparatus authenticating the mutual authentication message with the first authentication key comprises:

the first mobile apparatus calculating a sixth characteristic hash value obtained by hashing the input of the message formed by encrypting the second authentication key and the random number $r_a$ with the first authentication key, the message formed by encrypting the first authentication key and the random number $r_a$ with the second authentication key, the random number $r_a$, the random number $r_s$, the identification number of the access centralized control module and the message sequence number;

the first mobile apparatus decrypting the third message authentication information with the first authentication key, and acquiring a decrypted fifth characteristic hash value;

the first mobile apparatus determining whether the decrypted fifth characteristic hash value is consistent with the sixth characteristic hash value;

when the decrypted fifth characteristic hash value is consistent with the sixth characteristic hash value, the first mobile apparatus decrypting a message with the first authentication key, wherein the message formed by encrypting the second authentication key and the random number $r_a$ with the first authentication key, and acquiring a decrypted second authentication key and a decrypted random number $r_a$;

when the decrypted random number $r_a$ is consistent with the random number $r_a$ of the mutual authentication message, the first mobile apparatus determining that the mutual authentication message is authenticated successfully.

Optionally, the apparatus mutual authentication response message comprises a message formed by encrypting an identification number of the second mobile apparatus, a random number $r_a$ and an identification number of an access centralized control module with the first authentication key, a message sequence number and a fourth message authentication information; wherein, the fourth message authentication information comprises a message formed by encrypting a seventh characteristic hash value with the first authentication key; the seventh characteristic hash value is obtained by hashing an input of the message formed by encrypting the identification number of the second mobile apparatus, the random number $r_a$ and the identification number of the access centralized control module with the first authentication key, and the message sequence number;

the step of the first mobile apparatus authenticating the apparatus mutual authentication response message with the first authentication key comprises:

the first mobile apparatus calculating an eighth characteristic hash value obtained by hashing the input of the message formed by encrypting the identification number of the second mobile apparatus, the random number $r_a$ and the identification number of the access centralized control module with the first authentication key, and the message sequence number;

the first mobile apparatus decrypting the fourth message authentication information with the first authentication key, and acquiring a decrypted seventh characteristic hash value;

the first mobile apparatus determining whether the decrypted seventh characteristic hash value is consistent with the eighth characteristic hash value;

when the decrypted seventh characteristic hash value is consistent with the eighth characteristic hash value, the first mobile apparatus decrypting a message with the first authentication key, wherein the message formed by encrypting the identification number of the second mobile apparatus, the random number $r_a$ and the identification number of the access centralized control module with the first authentication key, and acquiring a decrypted identification number of the second mobile apparatus, a decrypted random number $r_a$ and a decrypted identification number of the access centralized control module;

when the decrypted random number $r_a$ is consistent with the random number $r_a$ of the apparatus mutual authentication response message, then determining that the second mobile apparatus corresponding to the decrypted identification number of the second mobile apparatus is a trust apparatus, and determining the apparatus mutual authentication response message is authenticated successfully.

The embodiment of the present application further disclosure a communication method of a communication network system, the communication network system comprises a plurality of mobile apparatuses, the mobile apparatuses comprise a first mobile apparatus and a second mobile apparatus, the second mobile apparatus stores a second authentication key; the method comprising:

the second mobile apparatus authenticating an apparatus mutual authentication request sent by the first mobile apparatus with the second authentication key;

when the apparatus mutual authentication request is authenticated successfully, the second mobile apparatus and the first mobile apparatus communicating with each other.

Optionally, the apparatus mutual authentication request comprises a message formed by encrypting an identification number of the first mobile apparatus, a random number $r_a$ and an identification number of an access centralized control module with the second authentication key, a message formed by encrypting a first authentication key and the random number $r_a$ with the second authentication key, the random number $r_a$, a random number $r_s$, the identification number of the access centralized control module, a message sequence number and a fifth message authentication information; wherein, the fifth message authentication information comprises a message formed by encrypting a ninth characteristic hash value with the second authentication key; the ninth characteristic hash value is obtained by hashing an input of the message formed by encrypting the identification number of the first mobile apparatus, the random number $r_a$ and the identification number of the access centralized control module with the second authentication key, the message formed by encrypting the first authentication key and the random number $r_a$ with the second authentication key, the random number $r_a$, the random number $r_s$, the identification number of the access centralized control module and the message sequence number;

the step of the second mobile apparatus authenticating the apparatus mutual authentication request sent by the first mobile apparatus with the second authentication key comprises:

the second mobile apparatus calculating a tenth characteristic hash value obtained by hashing the input of the message formed by encrypting the identification number of the first mobile apparatus, the random number $r_a$ and the identification number of the access centralized control module with the second authentication key, the message formed by encrypting the first authentication key and the random number $r_a$ with the second authentication key, the random number $r_a$, the random number $r_s$, the identification number of the access centralized control module and the message sequence number;

the second mobile apparatus decrypting the fifth message authentication information with the second authentication key, and acquiring a decrypted ninth characteristic hash value;

the second mobile apparatus determining whether the decrypted ninth characteristic hash value is consistent with the tenth characteristic hash value;

when the decrypted ninth characteristic hash value is consistent with the tenth characteristic hash value, the second mobile apparatus decrypting a message with the second authentication key, wherein the message formed by encrypting the first authentication key and the random number $r_a$ with the second authentication key, and acquiring a decrypted first authentication key and a decrypted random number $r_a$;

when the decrypted random number $r_a$ is consistent with the random number $r_a$ of the apparatus mutual authentication request, the second mobile apparatus determining that the apparatus mutual authentication request is authenticated successfully.

Optionally, the method further comprising:

the second mobile apparatus decrypting a message with the second authentication key, wherein the message formed by encrypting the identification number of the first mobile apparatus, the random number $r_a$ and the identification number of the access centralized control module with the second authentication key, and acquiring a decrypted identification number of the first mobile apparatus, a decrypted random number $r_a$ and a decrypted identification number of the access centralized control module;

when the decrypted random number $r_a$ is consistent with the random number $r_a$ of the apparatus mutual authentication request, the second mobile apparatus determining that the first mobile apparatus corresponding to the decrypted identification number of the first mobile apparatus is a trust apparatus.

Optionally, the method further comprising:

calculating the first initial authentication key according to a first root key and the random number $r_s$; and/or, calculating the second initial authentication key according to a second root key and the random number $r_s$.

Optionally, the method further comprising:

generating a first authentication key sequence according to a first initial authentication key and a random number $r_a$;

extracting the first authentication key from the first authentication key sequence.

Optionally, the method further comprising:

generating a second authentication key sequence according to a second initial authentication key and a random number $r_a$;

extracting the second authentication key from the second authentication key sequence.

The embodiment of the present application further disclosure an access control device, applied to a communication network system, the communication network system comprises an authentication server, the access control device and a plurality of mobile apparatuses, the mobile apparatuses comprise a first mobile apparatus and a second mobile apparatus, the access control device comprising:

a communication establishment request receiving module configured for the access control device to receive a communication establishment request sent by the first mobile apparatus;

a communication mutual authentication request sending module configured for the access control device to send a communication mutual authentication request to the authentication server in response to the communication establishment request;

a mutual authentication response message receiving module configured for the access control device to receive a mutual authentication response message sent by the authentication server in response to the communication mutual authentication request;

a mutual authentication response message authentication module configured for the access control device to authenticate the mutual authentication response message;

a mutual authentication message sending module, when the mutual authentication response message is authenticated successfully, configured for the access control device to send a mutual authentication message to the first mobile apparatus.

Optionally, the mutual authentication response message comprises a first initial authentication key encrypted by a public key of the access control device, a second initial authentication key encrypted by the public key of the access control device, an identification number of the authentication server, a random number $r_s$, a message sequence number and a first message authentication information; wherein the first authentication information comprises a first characteristic hash value and a first digital signature formed by encrypting the first characteristic hash value with a private key of the authentication server; the first characteristic hash value is obtained by hashing the input of the first initial authentication key, the second initial authentication key, the identification number of the authentication server, the random number $r_s$ and the message sequence number;

the mutual authentication response message authentication module comprises:

a first digital signature authentication submodule configured for the access control device to authenticate the first digital signature of the first message authentication information with the public key of the authentication server;

a first initial authentication key acquisition submodule, when the first message authentication information is authenticated successfully, configured for the access control device to decrypt the first initial authentication key encrypted by a public key of the access control device with a private key, and acquiring a decrypted first initial authentication key;

a second initial authentication key acquisition submodule configured for the access control device to decrypt the second initial authentication key encrypted by a public key of the access control device with the private key, and acquiring a decrypted second initial authentication key;

a second characteristic hash value acquisition submodule configured for the access control device to calculate hash value obtained by hashing the input of the decrypted first initial authentication key, the decrypted second initial authentication key, the identification number of the authentication server, the random number $r_s$ and the message sequence number, and acquiring a second characteristic hash value;

a first judgment submodule configured for the access control device to determine whether the first characteristic hash value is consistent with the second characteristic hash value;

a first determination submodule, when the first characteristic hash value is consistent with the second characteristic hash value, configured for the access control device to determine that the mutual authentication response message is authenticated successfully.

The embodiment of the present application further disclosure an authentication server, applied to a communication network system, the communication network system comprises the authentication server and an access control device, the authentication server comprising:

a communication mutual authentication request receiving module configured for the authentication server to receive a communication mutual authentication request sent by the access control device;

a communication mutual authentication request authentication module configured for the authentication server to authenticate a communication mutual authentication request;

a mutual authentication response message sending module, when the communication mutual authentication request is authenticated successfully, configured for the authentication server to send a mutual authentication response message to the access control device.

Optionally, the communication mutual authentication request comprises a sequence number of a first mobile apparatus, a sequence number of a second mobile apparatus, a message sequence number, an identification number of the access control device and a second message authentication information; the second message authentication information comprises a third characteristic hash value and a second digital signature formed by encrypting the third characteristic hash value with a private key of the access control device; the third characteristic hash value is obtained by hashing an input of the sequence number of the first mobile apparatus, the sequence number of the second mobile apparatus, the message sequence number and the identification number of the access control device;

the communication mutual authentication request authentication module comprises:

a second digital signature authentication submodule configured for the authentication server to authenticate the second digital signature of the second message authentication information with a public key of the access control device;

a fourth characteristic hash value acquisition submodule, when the second message authentication information is authenticated successfully, configured for the authentication to calculate hash value obtained by hashing the sequence number of the first mobile apparatus, the sequence number of the second mobile apparatus, the message sequence number and the identification number of the access control device, and acquiring a fourth characteristic hash value;

a second judgment submodule configured for the authentication server to determine whether the third characteristic hash value is consistent with the fourth characteristic hash value;

a second determination submodule, when the third characteristic hash value is consistent with the fourth characteristic hash value, configured for the authentication server to determine that the communication mutual authentication request is authenticated successfully.

The embodiment of the present application further disclosure a first mobile apparatus, applied to a communication network system, the communication network system comprises an authentication server, an access control device and a plurality of mobile apparatuses, the mobile apparatuses comprise a first mobile apparatus and a second mobile apparatus, the first mobile apparatus stores a first authentication key; the first mobile apparatus comprising:

a mutual authentication message receiving module, when a mutual authentication response message is authenticated successfully, configured for the first mobile apparatus to receive a mutual authentication message sent by the access control device;

a mutual authentication message authentication module configured for the first mobile apparatus to authenticate the mutual authentication message with the first authentication key;

an apparatus mutual authentication request sending module, when the mutual authentication message is authenticated successfully, configured for the first mobile apparatus sending an apparatus mutual authentication request to the second mobile apparatus;

an apparatus mutual authentication response message receiving module configured for the first mobile apparatus to receive an apparatus mutual authentication response message sent by the second mobile apparatus in response to the apparatus mutual authentication request;

an apparatus mutual authentication response message authentication module configured for the first mobile apparatus to authenticate the apparatus mutual authentication response message with the first authentication key;

a first communication module, when the apparatus mutual authentication response message is authenticated successfully, configured for the first mobile apparatus and the second mobile apparatus to communicate with each other.

Optionally, the mutual authentication message comprises a message formed by encrypting a second authentication key and a random number $r_a$ with the first authentication key, a message formed by encrypting the first authentication key and the random number $r_a$ with the second authentication key, the random number $r_a$, a random number $r_s$, an identification number of an access centralized control module, a message sequence number and a third message authentication information; wherein, the third message authentication information comprises a message formed by encrypting a fifth characteristic hash value with the first authentication key; the fifth characteristic hash value is obtained by hashing an input of the message formed by encrypting the second authentication key and the random number $r_a$ with the first authentication key, the message formed by encrypting the first authentication key and the random number $r_a$ with the second authentication key, the random number $r_a$, the random number $r_s$, the identification number of the access centralized control module and the message sequence number;

the mutual authentication message authentication module comprises:

a sixth characteristic hash value calculation submodule configured for the first mobile apparatus to calculate a sixth characteristic hash value obtained by hashing the input of the message formed by encrypting the second authentication key and the random number $r_a$ with the first authentication key, the message formed by encrypting the first authentication key and the random number $r_a$ with the second authentication key, the random number $r_a$, the random number $r_s$, the identification number of the access centralized control module and the message sequence number;

a fifth characteristic hash value acquisition submodule configured for the first mobile apparatus to decrypt the third message authentication information with the first authentication key, and acquiring a decrypted fifth characteristic hash value;

a third judgment submodule configured for the first mobile apparatus to determine whether the decrypted fifth characteristic hash value is consistent with the sixth characteristic hash value;

a second authentication key and random number $r_a$ acquisition submodule, when the decrypted fifth characteristic hash value is consistent with the sixth characteristic hash value, configured for the first mobile apparatus to decrypt a message with the first authentication key, wherein the message formed by encrypting the second authentication key and the random number $r_a$ with the first authentication key, and acquiring a decrypted second authentication key and a decrypted random number $r_a$;

a third determination submodule, when the decrypted random number $r_a$ is consistent with the random number $r_a$ of the mutual authentication message, configured for the first mobile apparatus to determine that the mutual authentication message is authenticated successfully.

Optionally, the apparatus mutual authentication response message comprises a message formed by encrypting an identification number of the second mobile apparatus, a random number $r_a$ and an identification number of an access centralized control module with the first authentication key, a message sequence number and a fourth message authentication information; wherein, the fourth message authentication information comprises a message formed by encrypting a seventh characteristic hash value with the first authentication key; the seventh characteristic hash value is obtained by hashing an input of the message formed by encrypting the identification number of the second mobile apparatus, the random number $r_a$ and the identification number of the access centralized control module with the first authentication key, and the message sequence number;

the apparatus mutual authentication response message authentication module comprises:

an eighth characteristic hash value acquisition submodule configured for the first mobile apparatus to calculate an eighth characteristic hash value obtained by hashing the input of the message formed by encrypting the identification number of the second mobile apparatus, the random number $r_a$ and the identification number of the access centralized control module with the first authentication key, and the message sequence number;

a seventh characteristic hash value acquisition submodule configured for the first mobile apparatus to decrypt the fourth message authentication information with the first authentication key, and acquiring a decrypted seventh characteristic hash value;

a fourth judgment submodule configured for the first mobile apparatus to determine whether the decrypted seventh characteristic hash value is consistent with the eighth characteristic hash value;

a first identification number acquisition submodule, when the decrypted seventh characteristic hash value is consistent with the eighth characteristic hash value, configured for the first mobile apparatus to decrypt a message with the first authentication key, wherein the message formed by encrypting the identification number of the second mobile apparatus, the random number $r_a$ and the identification number of the access centralized control module with the first authentication key, and acquiring a decrypted identification number of the second mobile apparatus, a decrypted random number $r_a$ and a decrypted identification number of the access centralized control module;

a fourth determination submodule, when the decrypted random number $r_a$ is consistent with the random number $r_a$ of the apparatus mutual authentication response message, configured to determine that the second mobile apparatus corresponding to the decrypted identification number of the second mobile apparatus is a trust apparatus, and to determine the apparatus mutual authentication response message is authenticated successfully.

The embodiment of the present application further disclosure a second mobile apparatus, applied to a communication network system, and the communication network system comprises a plurality of mobile apparatuses, the mobile apparatuses comprise a first mobile apparatus and a second mobile apparatus, the second mobile apparatus stores a second authentication key; the second mobile apparatus comprising:

apparatus mutual authentication request authentication module configured for the second mobile apparatus to authenticate an apparatus mutual authentication request sent by the first mobile apparatus with the second authentication key;

a second communication module, when the apparatus mutual authentication request is authenticated successfully, configured for the second mobile apparatus and the first mobile apparatus to communicate with each other.

Optionally, the apparatus mutual authentication request comprises a message formed by encrypting an identification number of the first mobile apparatus, a random number $r_a$ and an identification number of an access centralized control module with the second authentication key, a message formed by encrypting a first authentication key and the random number $r_a$ with the second authentication key, the random number $r_a$, a random number $r_s$, the identification number of the access centralized control module, a message sequence number and a fifth message authentication information; wherein, the fifth message authentication information comprises a message formed by encrypting a ninth characteristic hash value with the second authentication key; the ninth characteristic hash value is obtained by hashing an input of the message formed by encrypting the identification number of the first mobile apparatus, the random number $r_a$ and the identification number of the access centralized control module with the second authentication key, the message formed by encrypting the first authentication key and the random number $r_a$ with the second authentication key, the random number $r_a$, the random number $r_s$, the identification number of the access centralized control module and the message sequence number;

the apparatus mutual authentication request authentication module comprises:

a tenth characteristic hash value calculation submodule configured for the second mobile apparatus to calculate a tenth characteristic hash value obtained by hashing the input of the message formed by encrypting the identification number of the first mobile apparatus, the random number $r_a$ and the identification number of the access centralized control module with the second authentication key, the message formed by encrypting the first authentication key and the random number $r_a$ with the second authentication key, the random number $r_a$, the random number $r_s$, the identification number of the access centralized control module and the message sequence number;

a ninth characteristic hash value acquisition submodule configured for the second mobile apparatus to decrypt the fifth message authentication information with the second authentication key, and acquiring a decrypted ninth characteristic hash value;

a fifth judgment submodule configured for the second mobile apparatus to determine whether the decrypted ninth characteristic hash value is consistent with the tenth characteristic hash value;

a first authentication key and random number $r_a$ acquisition submodule, when the decrypted ninth characteristic hash value is consistent with the tenth characteristic hash value, configured for the second mobile apparatus to decrypt a message with the second authentication key, wherein the message formed by encrypting the first authentication key and the random number $r_a$ with the second authentication key, and acquiring a decrypted first authentication key and a decrypted random number $r_a$;

a fifth determination submodule, when the decrypted random number $r_a$ is consistent with the random number $r_a$ of the apparatus mutual authentication request, configured for the second mobile apparatus to determine that the apparatus mutual authentication request is authenticated successfully.

Optionally, the second mobile apparatus further comprising:

a second identification number acquisition module configured for the second mobile apparatus to decrypt a message with the second authentication key, wherein the message formed by encrypting the identification number of the first mobile apparatus, the random number $r_a$ and the identification number of the access centralized control module with the second authentication key, and acquiring a decrypted identification number of the first mobile apparatus, a decrypted random number $r_a$ and a decrypted identification number of the access centralized control module;

a sixth determination module, when the decrypted random number $r_a$ is consistent with the random number $r_a$ of the apparatus mutual authentication request, configured for the second mobile apparatus to determine that the first mobile apparatus corresponding to the decrypted identification number of the first mobile apparatus is a trust apparatus.

Optionally, the second mobile apparatus further comprising:

a first initial authentication key calculation module configured to calculate the first initial authentication key according to a first root key and the random number $r_s$; and/or, a second initial authentication key calculation module configured to calculate the second initial authentication key according to a second root key and the random number $r_s$.

Optionally, the second mobile apparatus further comprising:

a first authentication key sequence generation module configured to generate a first authentication key sequence according to a first initial authentication key and a random number $r_a$;

a first authentication key extraction module configured to extract the first authentication key from the first authentication key sequence.

Optionally, the second mobile apparatus further comprising:

a second authentication key sequence generation module configured to generate a second authentication key sequence according to a second initial authentication key and a random number $r_a$;

a second authentication key extraction module configured to extract the second authentication key from the second authentication key sequence.

The embodiment of the present application further discloses a communication network system, the communication network system comprises an authentication server, the access control device and a plurality of mobile apparatuses, the mobile apparatuses comprise a first mobile apparatus and a second mobile apparatus;

a communication establishment request sending module configured for the first mobile apparatus to send a communication establishment request to the access control device;

a communication mutual authentication request sending module configured for the access control device to send a communication mutual authentication request to the authentication server in response to the communication establishment request;

a communication mutual authentication request authentication module configured for the authentication server to authenticate a communication mutual authentication request;

a mutual authentication response message sending module, when the communication mutual authentication request is authenticated successfully, configured for the authentication server to send a mutual authentication response message to the access control device;

a mutual authentication response message authentication module configured for the access control device to authenticate the mutual authentication response message;

a mutual authentication message receiving module, when a mutual authentication response message is authenticated successfully, configured for the first mobile apparatus to receive a mutual authentication message sent by the access control device;

a mutual authentication message authentication module configured for the first mobile apparatus to authenticate the mutual authentication message with the first authentication key;

an apparatus mutual authentication request sending module, when the mutual authentication message is authenticated successfully, configured for the first mobile apparatus sending an apparatus mutual authentication request to the second mobile apparatus;

an apparatus mutual authentication response message sending module configured for the second mobile apparatus to send an apparatus mutual authentication response message to the first mobile apparatus in response to the apparatus mutual authentication request;

an apparatus mutual authentication response message authentication module configured for the first mobile apparatus to authenticate the apparatus mutual authentication response message with the first authentication key;

a third communication module, when the apparatus mutual authentication response message is authenticated successfully, configured for the first mobile apparatus and the second mobile apparatus to communicate with each other.

The embodiments of the present application have the following advantages:

In the embodiments of the present application, the communication network system comprises an authentication server, an access control device and a plurality of mobile apparatuses, the mobile apparatuses comprise a first mobile apparatus and a second mobile apparatus, the access control device receiving a communication establishment request sent by the first mobile apparatus; the access control device sending a communication mutual authentication request to the authentication server in response to the communication establishment request; the access control device receiving a mutual authentication response message sent by the authentication server in response to the communication mutual authentication request; the access control device authenticating the mutual authentication response message; and when the mutual authentication response message is authenticated successfully, the access control device sending a mutual authentication message to the first mobile apparatus. The embodiments of the application utilize the cooperative work of the access control device and the authentication server to achieve the mutual authentication between mobile apparatuses in the D2D communication. At the same time, the hash chain mechanism and the access control device are used in conjunction with the authentication server to implement the distribution and decentralization of authentication functions, thereby reducing the load of the authentication server and improving the efficiency of authentication.

BRIEF DESCRIPTION OF THE DRAWINGS

In order to more clearly explain the technical solutions in the embodiments of the present application, the drawings required in the description of the embodiments will be briefly introduced below. Obviously, the drawings in the following description are only some embodiments of the application For those of ordinary skill in the art, without paying any creative labor, other drawings can also be obtained based on these drawings.

FIG. 6 is a flow chart of steps of a communication method of a communication network system according to a fourth embodiment of the present application;

DETAILED DESCRIPTION OF THE EMBODIMENTS

In order to make the technical problems, technical solutions, and beneficial effects solved by the embodiments of the present application clearer, the embodiments of the present application are further described in detail below in conjunction with the drawings and the embodiments. It should be understood that the specific embodiments described herein are only used to explain the present application, and are not intended to limit the present application.

Figure 1:
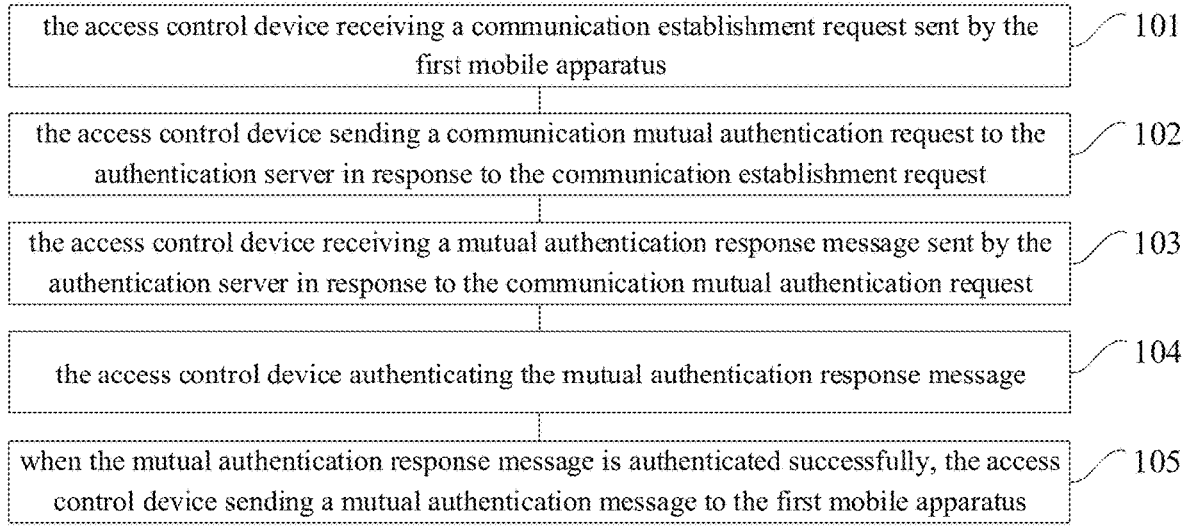
FIG. 1 is a flow chart of steps of a message authentication method of a communication network system according to a first embodiment of the present application.

Referring to FIG. 1, a flow chart of steps of a message authentication method of a communication network system according to a first embodiment of the present application is illustrated, the communication network system comprises an authentication server, an access control device and a plurality of mobile apparatuses, the mobile apparatuses comprise a first mobile apparatus and a second mobile apparatus, which may specifically include the following steps:

In step 101, the access control device receiving a communication establishment request sent by the first mobile apparatus;

In the embodiment of the present application, the communication network system may include an authentication server, an access control device and a plurality of mobile apparatuses, and may further include communication devices such as a base station, which is not limited in the embodiment of the present application.

In an optional embodiment of the present application, the authentication server may exist in the form of a virtual cloud, and the access control device may be integrated on the authentication server, or may be run in the communication network system as a separate physical device.

Figure 2:
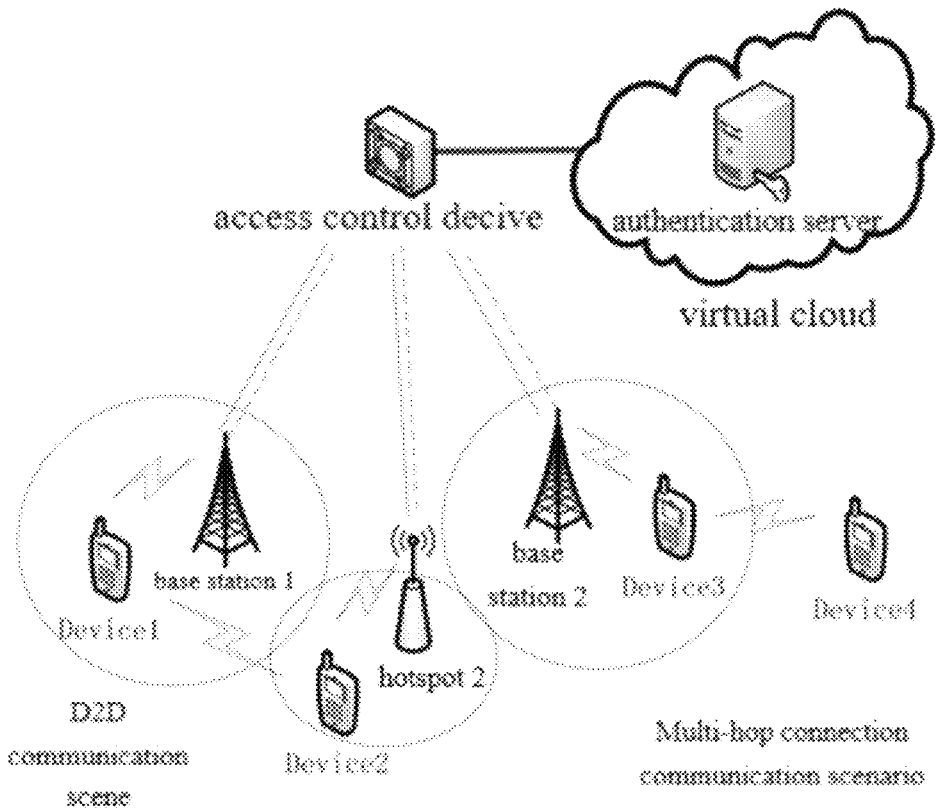
FIG. 2 is a schematic diagram of a communication network system according to an embodiment of the present application.

Referring to FIG. 2, a schematic diagram of a communication network system according to an embodiment of the present application is illustrated, a plurality of mobile apparatuses are connected with the access control device through the base station or a hotspot device, and the access control device are connected to the authentication server, the embodiment of the present application can be applied to a D2D communication scenario or a multi-hop connection communication scenario. Of course, it can also be applied to other scenarios, which are not limited in the embodiments of the present application.

Furthermore, the authentication server, the access control device and the mobile devices are preset with initialization information, respectively;

For example, the initialization information of the authentication server includes A: a mobile apparatus authentication information table for the authentication server; B: a digital certificate of the authentication server and a corresponding private key; C: an identification number and a digital certificate of the access control device; wherein, the mobile apparatus authentication information table includes a mobile apparatus serial number and a root key of the mobile apparatus, the initial authentication key can be derived from the root key, the root keys include a first root key of the first mobile apparatus and a second root key of the second mobile apparatus, the initial authentication keys include a first initial authentication key and a second initial authentication key, the root keys is not applied directly to authentication process, the initial authentication keys do not change during the life circle of the device, unless special circumstances occur, the root key stored on the mobile apparatus side needs to be updated at the same time.

It should be noted that the authentication server can calculate the first initial authentication key according to the first root key and a random number $r_s$; and/or, calculate the second initial authentication key according to the second root key and the random number $r_s$; hash an input of the first initial authentication key and a random number $r_a$, a first authentication key sequence is generated by cyclic nesting, wherein, the first authentication key sequence includes a plurality of first authentication key; similarly, the authentication server can hash an input of the second initial authentication key and the random number $r_a$, and a second authentication key sequence is generated by cyclic nesting, wherein, the second authentication key sequence includes a plurality of second authentication key.

The authentication server can send the first authentication key sequence and the second authentication key sequence to the access control device.

In addition, the initialization information of the access control device includes A: an identification number allocation table of the mobile apparatus; B: a mobile apparatus authentication information table for the access control device; C: a digital certificate of the access control device and a corresponding private key; D: the digital certificate of the authentication server; wherein, the identification number allocation of the mobile apparatus includes the mobile apparatus serial number and an identification number of mobile apparatus, the mobile apparatus serial number is the unique apparatus serial number corresponding to the mobile apparatus; the mobile apparatus authentication information table for the access control device may include the mobile apparatus serial number, the authentication key sequence and the usage status of the authentication key; the authentication key sequence is generated according to the initial authentication key by cyclic nesting; the usage status of the authentication key is when the value of the corresponding bit is set to 1, indicating that the authentication key at the corresponding position is the currently used authentication key.

Finally, the initialization information of the mobile apparatus includes the root key of the mobile apparatus, the root key of the mobile apparatus corresponds to the root key of the mobile apparatus in the authentication server, and the root key of the same mobile apparatus is consistent with the root key in the authentication server; the authentication key sequence in the mobile apparatus side is generated and stored safely by the mobile apparatus, the usage status of the authentication key is when the value of the corresponding bit is set to 1, indicating that the authentication key at the corresponding position is the currently used authentication key.

In the embodiment of the present application, the access control device receiving a communication establishment request sent by the first mobile apparatus; the first mobile apparatus sending the communication establishment request to the access control device; wherein, the communication establishment request includes a message type number of the communication establishment request, an identification number of the first mobile apparatus and an identification number of the second mobile apparatus; the identification number of the first mobile apparatus is the identification number of the mobile apparatus corresponding to the first mobile apparatus; the identification number of the second mobile apparatus is the identification number of the mobile apparatus corresponding to the second mobile apparatus.

In step 102, the access control device sending a communication mutual authentication request to the authentication server in response to the communication establishment request;

Furthermore, when the access control device receives the communication establishment request sent by the first mobile apparatus, the access control device can inquire the identification number allocation table of the mobile apparatus, to examine the validity of the identification number of the second mobile apparatus, namely to examine whether the identification number of the second mobile apparatus exists in the identification number allocation table of the mobile apparatus.

When the access control device determines that the identification number of the second mobile apparatus exists in the identification number allocation table of the mobile apparatus, the access control device constructs the communication mutual authentication request, and sends it to the authentication server.

In step 103, the access control device receiving a mutual authentication response message sent by the authentication server in response to the communication mutual authentication request;

Practical application to the embodiments of the present application, the communication mutual authentication request may include a sequence number of a first mobile apparatus, a sequence number of a second mobile apparatus, a message sequence number, an identification number of the access control device and a second message authentication information; the second message authentication information comprises a third characteristic hash value and a second digital signature formed by encrypting the third characteristic hash value with the private key of the access control device; the third characteristic hash value is obtained by hashing an input of the sequence number of the first mobile apparatus, the sequence number of the second mobile apparatus, the message sequence number and the identification number of the access control device; after the authentication server authenticating the communication mutual authentication request successfully, the authentication server constructs the mutual authentication response message, and sends it to the access control device.

In step 104, the access control device authenticating the mutual authentication response message;

In practical application, when the access control device receives the mutual authentication response message, the access control device can authenticate the mutual authentication response message.

Specifically, the mutual authentication response message includes a first initial authentication key encrypted by a public key of the access control device, a second initial authentication key encrypted by the public key of the access control device, an identification number of the authentication server, a random number $r_s$, a message sequence number and a first message authentication information; wherein the first message authentication information comprises a first characteristic hash value and a first digital signature formed by encrypting the first characteristic hash value with a private key of the authentication server; the first characteristic hash value is obtained by hashing an input of the first initial authentication key, the second initial authentication key, the identification number of the authentication server, the random number $r_s$ and the message sequence number.

It should be noted that the mutual authentication response message may further include a type number of the mutual authentication response message, which is not limited in the embodiments of the present application; the first initial authentication key encrypted by the public key of the access control device is the first initial authentication key encrypted by using the public key of the access control device, the second initial authentication key encrypted by the public key of the access control device is the second initial authentication key encrypted by using the public key of the access control device; while the first message authentication information is composed of two parts, one is the first characteristic hash value, the other is the first digital signature formed by encrypting the first characteristic hash value with the private key of the authentication server; wherein, the first characteristic hash value is obtained by hashing the input of the first initial authentication key, the second initial authentication key, the identification number of the authentication server, the random number $r_s$ and the message sequence number, which is to input the first initial authentication key, the second initial authentication key, the identification number of the authentication server, the random number $r_s$ and the message sequence number into a hash function, and acquiring the first characteristic hash value.

In an optional embodiment of the present application, the step of the access control device authenticating the mutual authentication response message includes the following sub-steps:

In sub-step S1041, the access control device authenticating the first digital signature of the first message authentication information with the public key of the authentication server;

In sub-step S1042, when the first message authentication information is authenticated successfully, the access control device decrypting the first initial authentication key with a private key, and acquiring a decrypted first initial authentication key;

In sub-step S1043, the access control device decrypting the second initial authentication key with the private key, and acquiring a decrypted second initial authentication key;

In sub-step S1044, the access control device calculating hash value obtained by hashing an input of the decrypted first initial authentication key, the decrypted second initial authentication key, the identification number of the authentication server, the random number $r_s$ and the message sequence number, and acquiring a second characteristic hash value;

In sub-step S1045, the access control device determining whether the first characteristic hash value is consistent with the second characteristic hash value;

In sub-step S1046, when the first characteristic hash value is consistent with the second characteristic hash value, the access control device determining that the mutual authentication response message is authenticated successfully.

In practical application, after the access control device authenticating the first digital signature of the first message authentication information with the public key of the authentication server, the access control device then uses its stored private key to authenticate the digital signature, finally, the access control device can determine whether the first characteristic hash value is consistent with the second characteristic hash value after calculating and obtaining the second characteristic hash value, when the first characteristic hash value is consistent with the second characteristic hash value, the access control device determines that the mutual authentication response message is authenticated successfully.

In step 105, when the mutual authentication response message is authenticated successfully, the access control device sending a mutual authentication message to the first mobile apparatus.

Specifically applied to the embodiment of the present application, the access control device authenticates the mutual authentication response message, in particular, the access control device authenticates the first digital signature with the public key of the authentication server, wherein, the first digital signature is formed by encrypting the first characteristic hash value with the private key of the authentication server; and the access control device decrypts the first initial authentication key and the second initial authentication key; finally, the access control device determines whether the first characteristic hash value is consistent with the second characteristic hash value; when the first characteristic hash value is consistent with the second characteristic hash value, the access control device determines that the mutual authentication response message is authenticated successfully, then the access control device constructs the mutual authentication message, and sends it to the first mobile apparatus.

In the embodiment of the present application, the communication network system includes the authentication server, the access control device and a plurality of mobile apparatuses, the mobile apparatuses comprise the first mobile apparatus and the second mobile apparatus, the access control device receives the communication establishment request sent by the first mobile apparatus; the access control device sends the communication mutual authentication request to the authentication server in response to the communication establishment request; the access control device receives the mutual authentication response message sent by the authentication server in response to the communication mutual authentication request; the access control device authenticates the mutual authentication response message; when the mutual authentication response message is authenticated successfully, the access control device sending the mutual authentication message to the first mobile apparatus. The embodiments of the application utilize the cooperative work of the access control device and the authentication server to achieve the mutual authentication between mobile apparatuses in the D2D communication. At the same time, the hash chain mechanism and the access control device are used in conjunction with the authentication server to implement the distribution and decentralization of authentication functions, thereby reducing the load of the authentication server and improving the efficiency of authentication.

Figure 3:
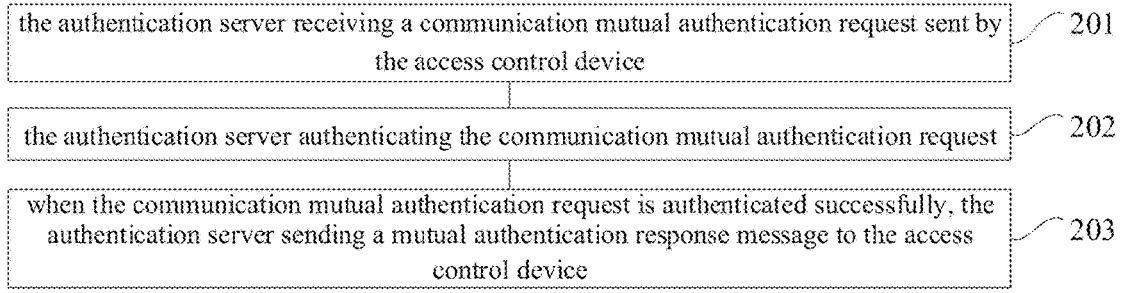
FIG. 3 is a flow chart of steps of a message authentication method of a communication network system according to a second embodiment of the present application.

Referring to FIG. 3, a flow chart of steps of a message authentication method of a communication network system according to a second embodiment of the present application is illustrated, the communication network system includes a authentication server and a access control device, specifically includes the following steps:

In step 201, the authentication server receiving a communication mutual authentication request sent by the access control device;

In the embodiment of the present application, the authentication server receives the communication mutual authentication request sent by the access control device, wherein, the communication mutual authentication request may include a sequence number of a first mobile apparatus, a sequence number of a second mobile apparatus, a message sequence number, an identification number of the access control device and a second message authentication information; the second message authentication information comprises a third characteristic hash value and a second digital signature formed by encrypting the third characteristic hash value with a private key of the access control device; the third characteristic hash value is obtained by hashing an input of the sequence number of the first mobile apparatus, the sequence number of the second mobile apparatus, the message sequence number and the identification number of the access control device.

It should be noted that the message sequence number is a random number used to indicate the sequence of the message, and it increases continuously with the transmission of the message; for example, the message sequence number of the communication mutual authentication request is N, then the message sequence number of the next message is N+1. The sequence number of the first mobile apparatus and the sequence number of the second mobile apparatus can be inquired according to the identification number of the mobile apparatus in the communication establishment request. The second message authentication information is composed of two parts, one is the third characteristic hash value, and the other is the second digital signature formed by encrypting the third characteristic hash value with the private key of the access control device. The third characteristic hash value is obtained by hashing the input of the sequence number of the first mobile apparatus, the sequence number of the second mobile apparatus, the message sequence number and the identification number of the access control device, which is to input the sequence number of the first mobile apparatus, the sequence number of the second mobile apparatus, the message sequence number and the identification number of the access control device into the hash function, and acquiring the third characteristic hash value.

In step 202, the authentication server authenticating the communication mutual authentication request;

Specifically applied to the embodiment of the present application, the authentication server can authenticate the communication mutual authentication request. Firstly, the authentication server authenticates the second digital signature of the second message authentication information with the public key of the access control device, when the second digital signature is authenticated successfully, then authenticates whether third characteristic hash value is consistent with the fourth characteristic hash value, when the third characteristic hash value is consistent with the fourth characteristic hash value, the authentication server determines that the communication mutual authentication request is authenticated successfully.

In an optional embodiment of the present application, the step of the authentication server authenticating the communication mutual authentication request includes the following sub-steps:

In sub-step S2021, the authentication server authenticating the second digital signature of the second message authentication information with the public key of the access control device;

In sub-step S2022, when the second message authentication information is authenticated successfully, the authentication server calculating hash value obtained by hashing the input of the sequence number of the first mobile apparatus, the sequence number of the second mobile apparatus, the message sequence number and the identification number of the access control device, and acquiring a fourth characteristic hash value;

In sub-step S2023, the authentication server determining whether the third characteristic hash value is consistent with the fourth characteristic hash value;

In sub-step S2024, when the third characteristic hash value is consistent with the fourth characteristic hash value, the authentication server determining that the communication mutual authentication request is authenticated successfully.

In step 203, when the communication mutual authentication request is authenticated successfully, the authentication server sending a mutual authentication response message to the access control device.

Furthermore, when the communication mutual authentication request is authenticated successfully, the authentication server constructs the mutual authentication response message, and sends it to the access control device.

In the embodiment of the present application, the communication network system includes the authentication server and the access control device, the authentication server receives the communication mutual authentication request sent by the access control device; the authentication server authenticates the communication mutual authentication request; when the communication mutual authentication request is authenticated successfully, the authentication server sends the mutual authentication response message to the access control device. The embodiment of the present application implements a distributed mode of authentication service functions, and the access control device is used in conjunction with the authentication server to implement the decentralization of authentication functions, which reduces the load on the authentication server and improves the efficiency of authentication.

Figure 4:
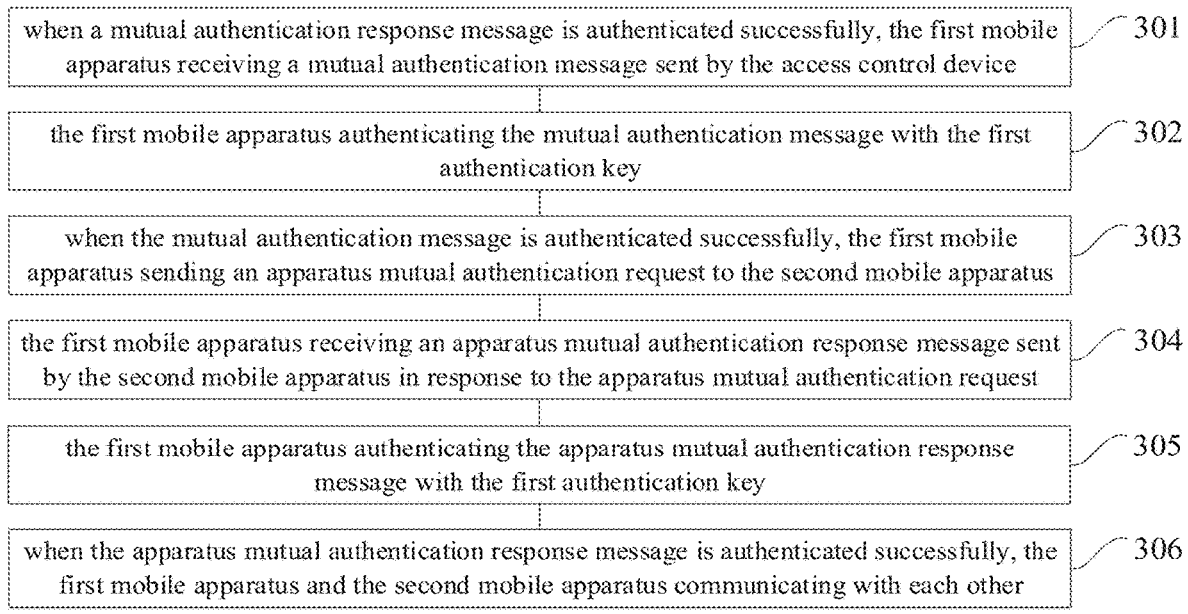
FIG. 4 is a flow chart of steps of a communication method of a communication network system according to a third embodiment of the present application.

Referring to FIG. 4, a flow chart of steps of a communication method of a communication network system according to a third embodiment of the present application is illustrated. The communication network system comprises an authentication server, an access control device and a plurality of mobile apparatuses, the mobile apparatuses comprise a first mobile apparatus and a second mobile apparatus, the first mobile apparatus stores a first authentication key; which includes the following steps:

In step 301, when a mutual authentication response message is authenticated successfully, the first mobile apparatus receiving a mutual authentication message sent by the access control device;

In the embodiment of the present application, if the mutual authentication response message received by the access control device is authenticated successfully, the access control device sends the mutual authentication message to the first mobile apparatus; the first mobile apparatus receives the mutual authentication message, and authenticates it.

In step 302, the first mobile apparatus authenticating the mutual authentication message with the first authentication key;

It should be noted that, the first mobile apparatus stores the first authentication key, the first initial authentication key and the random number $r_a$ are inputted into the hash function, and the first authentication key sequence is generated by cyclic nesting, and the first authentication key is extracted from the first authentication key sequence. Furthermore, the first initial authentication key is obtained by hashing the input of the first root key and the random number $r_s$. Similarly, the second mobile apparatus stores the second authentication key, the second initial authentication key and the random number $r_a$ are inputted into the hash function, and the second authentication key sequence is generated by cyclic nesting, and the second authentication key is extracted from the second authentication key sequence. Furthermore, the second initial authentication key is obtained by hashing the input of the second root key and the random number $r_s$.

Figure 5:
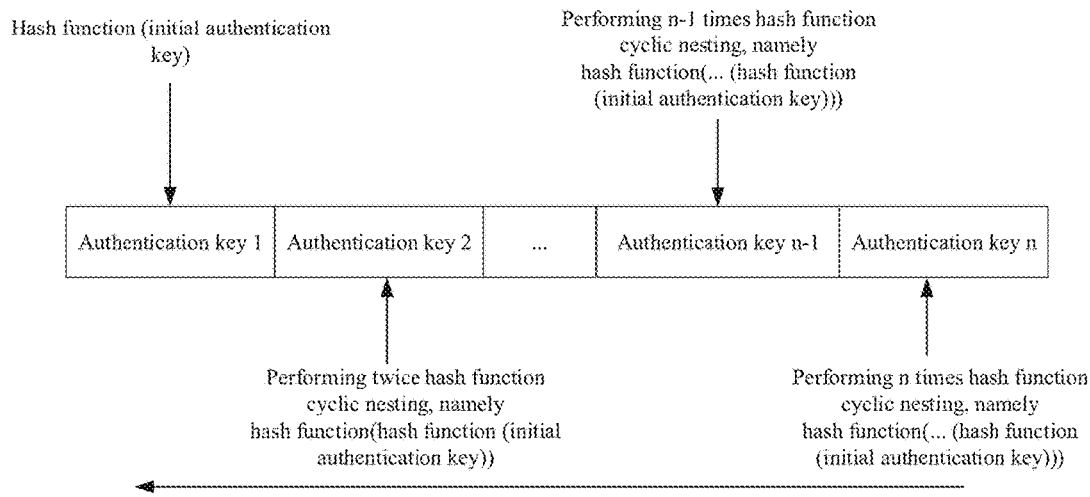
FIG. 5 is a schematic diagram of an authentication key sequence according to an embodiment of the present application.

Specifically, referring to FIG. 5, a schematic diagram of an authentication key sequence according to an embodiment of the present application is illustrated. Wherein, the authentication key sequence includes the first authentication key sequence and the second authentication key sequence. As shown in FIG. 5, the authentication key 1 is obtained by inputting the initial authentication key into the hash function, while the authentication key 2 is obtained by inputting the authentication key 1 into the hash function, which is obtained by performing twice hash function nesting. If authentication key 1 is hash function (initial authentication key), then the authentication key 2 is: hash function (hash function (initial authentication key)), and so on. The authentication key n−1 is obtained by performing n−1 times hash function nesting, which is that: hash function ( . . . (hash function (initial authentication key))). The authentication key n is obtained by performing n times hash function nesting, which is that: hash function ( . . . (hash function (initial authentication key))). The utilization sequence of the authentication key is from right to left, that is to use the authentication key n at first, then use the authentication key n−1, . . . use the authentication key 1 finally. It should be noted that, when the initial authentication key is the first initial authentication key, the authentication key sequence is the first authentication key sequence, the first authentication key sequence may be generated on the first mobile apparatus, while, it may also be generated on the authentication server. When the initial authentication key is the second initial authentication key, the authentication key sequence is the second authentication key sequence, the second authentication key sequence may be generated on the second mobile apparatus, while, it may also be generated on the authentication server.

Practically applied to the embodiment of the present application, the mutual authentication message comprises a message formed by encrypting a second authentication key and a random number $r_a$ with the first authentication key, a message formed by encrypting the first authentication key and the random number $r_a$ with the second authentication key, the random number $r_a$, a random number $r_s$, an identification number of an access centralized control module, a message sequence number and a third message authentication information; wherein, the third message authentication information comprises a message formed by encrypting a fifth characteristic hash value with the first authentication key; the fifth characteristic hash value is obtained by hashing an input of the message formed by encrypting the second authentication key and the random number $r_a$ with the first authentication key, the message formed by encrypting the first authentication key and the random number $r_a$ with the second authentication key, the random number $r_a$, the random number $r_s$, the identification number of the access centralized control module and the message sequence number.

In detail, encrypting the second authentication key and the random number $r_a$ with the first authentication key of the access control device, and encrypting the first authentication key and the random number $r_a$ with the second authentication key of the access control device.

In an optional embodiment of the present application, the step of the first mobile apparatus authenticating the mutual authentication message with the first authentication key includes the following sub-steps:

In sub-step S3021, the first mobile apparatus calculating a sixth characteristic hash value obtained by hashing the input of the message formed by encrypting the second authentication key and the random number $r_a$ with the first authentication key, the message formed by encrypting the first authentication key and the random number $r_a$ with the second authentication key, the random number $r_a$, the random number $r_s$, the identification number of the access centralized control module and the message sequence number;

In sub-step S3022, the first mobile apparatus decrypting the third message authentication information with the first authentication key, and acquiring a decrypted fifth characteristic hash value;

In sub-step S3023, the first mobile apparatus determining whether the decrypted fifth characteristic hash value is consistent with the sixth characteristic hash value;

In sub-step S3024, when the decrypted fifth characteristic hash value is consistent with the sixth characteristic hash value, the first mobile apparatus decrypting a message with the first authentication key, wherein the message formed by encrypting the second authentication key and the random number $r_a$ with the first authentication key, and acquiring a decrypted second authentication key and a decrypted random number $r_a$;

In sub-step S3025, when the decrypted random number $r_a$ is consistent with the random number $r_a$ of the mutual authentication message, the first mobile apparatus determining that the mutual authentication message is authenticated successfully.

Firstly, the first mobile apparatus will determine whether the decrypted fifth characteristic hash value is consistent with the sixth characteristic hash value; when the two are consistent, the first mobile apparatus will further determine whether the decrypted random number $r_a$ is consistent with the random number $r_a$ of the mutual authentication message; when the decrypted random number $r_a$ is consistent with the random number $r_a$ of the mutual authentication message, the first mobile apparatus determines that the mutual authentication message is authenticated successfully.

In step 303, when the mutual authentication message is authenticated successfully, the first mobile apparatus sending an apparatus mutual authentication request to the second mobile apparatus;

Specifically, when the mutual authentication message is authenticated successfully, the first mobile apparatus constructs an apparatus mutual authentication request, and sends it to the second mobile apparatus. Wherein, the apparatus mutual authentication request comprises a message formed by encrypting an identification number of the first mobile apparatus, a random number $r_a$ and an identification number of an access centralized control module with the second authentication key, a message formed by encrypting a first authentication key and the random number $r_a$ with the second authentication key, the random number $r_a$, a random number $r_s$, the identification number of the access centralized control module, a message sequence number and a fifth message authentication information; wherein, the fifth message authentication information comprises a message formed by encrypting a ninth characteristic hash value with the second authentication key; the ninth characteristic hash value is obtained by hashing an input of the message formed by encrypting the identification number of the first mobile apparatus, the random number $r_a$ and the identification number of the access centralized control module with the second authentication key, the message formed by encrypting the first authentication key and the random number $r_a$ with the second authentication key, the random number $r_a$, the random number $r_s$, the identification number of the access centralized control module and the message sequence number. The apparatus mutual authentication request may further include a message type number of the apparatus mutual authentication request, which is not limited in the embodiment of the present application.

Referring to table 1, a message type number table of the embodiments of the present application is illustrated;

| | |
|---|---|
| communication establishment request message | 100 |
| communication mutual authentication request message | 200 |
| communication mutual authentication response message | 300 |
| mutual authentication message | 400 |
| apparatus mutual authentication request message | 500 |
| apparatus mutual authentication response message | 600 |

As shown in table 1, the message type number of the communication establishment request message is 100; the message type number of communication mutual authentication request message is 200; the message type number of the communication mutual authentication response message is 300; the message type number of the mutual authentication message is 400; the message type number of the apparatus mutual authentication request message is 500; the message type number of the apparatus mutual authentication response message is 600.

In step 304, the first mobile apparatus receiving an apparatus mutual authentication response message sent by the second mobile apparatus in response to the apparatus mutual authentication request;

After the second mobile apparatus authenticating the apparatus mutual authentication request successfully, it sends the apparatus mutual authentication response message to the first mobile apparatus.

In step 305, the first mobile apparatus authenticating the apparatus mutual authentication response message with the first authentication key;

Specifically applied to the embodiment of the present application, the apparatus mutual authentication response message includes a message formed by encrypting an identification number of the second mobile apparatus, a random number $r_a$ and an identification number of an access centralized control module with the first authentication key, a message sequence number and a fourth message authentication information; wherein, the fourth message authentication information comprises a message formed by encrypting a seventh characteristic hash value with the first authentication key; the seventh characteristic hash value is obtained by hashing an input of the message formed by encrypting the identification number of the second mobile apparatus, the random number $r_a$ and the identification number of the access centralized control module with the first authentication key, and the message sequence number.

In an optional embodiment of the present application, the step of the first mobile apparatus authenticating the apparatus mutual authentication response message with the first authentication key includes the following sub-steps:

In sub-step S3051, the first mobile apparatus calculating an eighth characteristic hash value obtained by hashing the input of the message formed by encrypting the identification number of the second mobile apparatus, the random number $r_a$ and the identification number of the access centralized control module with the first authentication key, and the message sequence number;

In sub-step S3052, the first mobile apparatus decrypting the fourth message authentication information with the first authentication key, and acquiring a decrypted seventh characteristic hash value;

In sub-step S3053, the first mobile apparatus determining whether the decrypted seventh characteristic hash value is consistent with the eighth characteristic hash value;

In sub-step S3054, when the decrypted seventh characteristic hash value is consistent with the eighth characteristic hash value, the first mobile apparatus decrypting a message with the first authentication key, wherein the message formed by encrypting the identification number of the second mobile apparatus, the random number $r_a$ and the identification number of the access centralized control module with the first authentication key, and acquiring a decrypted identification number of the second mobile apparatus, a decrypted random number $r_a$ and a decrypted identification number of the access centralized control module;

In sub-step S3055, when the decrypted random number $r_a$ is consistent with the random number $r_a$ of the apparatus mutual authentication response message, then determining that the second mobile apparatus corresponding to the decrypted identification number of the second mobile apparatus is a trust apparatus, and determining the apparatus mutual authentication response message is authenticated successfully.

In practical application, the first mobile apparatus decrypts the fourth message authentication information with the first authentication key, and acquires a decrypted seventh characteristic hash value; then determines whether the decrypted seventh characteristic hash value is consistent with the eighth characteristic hash value; after determining the message integrity, further decrypts the message with the first authentication key, wherein the message formed by encrypting the identification number of the second mobile apparatus, the random number $r_a$ and the identification number of the access centralized control module with the first authentication key, and acquires the decrypted identification number of the second mobile apparatus, the decrypted random number $r_a$ and the decrypted identification number of the access centralized control module. When the decrypted random number $r_a$ is consistent with the random number $r_a$ of the apparatus mutual authentication response message, then determining that the second mobile apparatus corresponding to the decrypted identification number of the second mobile apparatus is a trust apparatus.

In step 306, when the apparatus mutual authentication response message is authenticated successfully, the first mobile apparatus and the second mobile apparatus communicating with each other.

Furthermore, when the apparatus mutual authentication response message is authenticated successfully, determines that the second mobile apparatus corresponding to the decrypted identification number of the second mobile apparatus is a trust apparatus, and the first mobile apparatus and the second mobile apparatus communicating with each other.

In the embodiment of the present application, the communication network system includes the authentication server, the access control device and a plurality of mobile apparatuses, the mobile apparatuses comprise the first mobile apparatus and the second mobile apparatus, the first mobile apparatus stores the first authentication key; when the mutual authentication response message is authenticated successfully, the first mobile apparatus receives the mutual authentication message sent by the access control device; the first mobile apparatus authenticates the mutual authentication message with the first authentication key; when the mutual authentication message is authenticated successfully, the first mobile apparatus sends the apparatus mutual authentication request to the second mobile apparatus; the first mobile apparatus receives the apparatus mutual authentication response message sent by the second mobile apparatus in response to the apparatus mutual authentication request; the first mobile apparatus authenticates the apparatus mutual authentication response message with the first authentication key; when the apparatus mutual authentication response message is authenticated successfully, the first mobile apparatus and the second mobile apparatus communicate with each other. In the embodiment of the present application, a combination of asymmetric keys and symmetric keys is used to construct and authenticate the message; further, the hash function is used to calculate the hash value, then an authentication message with low-computation is constructed. A hash chain mechanism is introduced to construct the authentication key sequence, while using one-way hash function to ensure the security of the key, and greatly reduces the amount of calculation.

Referring to FIG. 6, a flow chart of steps of a communication method of a communication network system according to a fourth embodiment of the present application is illustrated, the communication network system comprises a plurality of mobile apparatuses, the mobile apparatuses comprise a first mobile apparatus and a second mobile apparatus, the second mobile apparatus stores a second authentication key; which includes the following steps in detail:

In step 401, the second mobile apparatus authenticating an apparatus mutual authentication request sent by the first mobile apparatus with the second authentication key;

In the embodiment of the present application, the second mobile apparatus stores the second authentication key, and the second mobile apparatus authenticates the apparatus mutual authentication request with the second authentication key.

Specifically, the apparatus mutual authentication request includes the message formed by encrypting an identification number of the first mobile apparatus, the random number $r_a$ and the identification number of the access centralized control module with the second authentication key, the message formed by encrypting the first authentication key and the random number $r_a$ with the second authentication key, the random number $r_a$, the random number $r_s$, the identification number of the access centralized control module, the message sequence number and the fifth message authentication information; wherein, the fifth message authentication information includes the message formed by encrypting the ninth characteristic hash value with the second authentication key;

the ninth characteristic hash value is obtained by hashing the input of the message formed by encrypting the identification number of the first mobile apparatus, the random number $r_a$ and the identification number of the access centralized control module with the second authentication key, the message formed by encrypting the first authentication key and the random number $r_a$ with the second authentication key, the random number $r_a$, the random number $r_s$, the identification number of the access centralized control module and the message sequence number.

In an optional embodiment of the present application, the step of the second mobile apparatus authenticating the apparatus mutual authentication request sent by the first mobile apparatus with the second authentication key includes the following sub-steps:

In sub-step S4011, the second mobile apparatus calculating a tenth characteristic hash value obtained by hashing the input of the message formed by encrypting the identification number of the first mobile apparatus, the random number $r_a$ and the identification number of the access centralized control module with the second authentication key, the message formed by encrypting the first authentication key and the random number $r_a$ with the second authentication key, the random number $r_a$, the random number $r_s$, the identification number of the access centralized control module and the message sequence number;

In sub-step S4012, the second mobile apparatus decrypting the fifth message authentication information with the second authentication key, and acquiring a decrypted ninth characteristic hash value;

In sub-step S4013, the second mobile apparatus determining whether the decrypted ninth characteristic hash value is consistent with the tenth characteristic hash value;

In sub-step S4014, when the decrypted ninth characteristic hash value is consistent with the tenth characteristic hash value, the second mobile apparatus decrypting a message with the second authentication key, wherein the message formed by encrypting the first authentication key and the random number $r_a$ with the second authentication key, and acquiring a decrypted first authentication key and a decrypted random number $r_a$;

In sub-step S4015, when the decrypted random number $r_a$ is consistent with the random number $r_a$ of the apparatus mutual authentication request, the second mobile apparatus determining that the apparatus mutual authentication request is authenticated successfully.

Specifically, the second mobile apparatus determines whether the decrypted ninth characteristic hash value is consistent with the tenth characteristic hash value, when the two are consistent, the second mobile apparatus decrypts the message with the second authentication key, wherein the message formed by encrypting the first authentication key and the random number $r_a$ with the second authentication key, and acquires the decrypted first authentication key and the decrypted random number $r_a$; the second mobile apparatus further determines whether the decrypted random number $r_a$ is consistent with the random number $r_a$ of the apparatus mutual authentication request; if it is, then determines that the apparatus mutual authentication request is authenticated successfully.

In an optional embodiment of the present application, the method further includes: the second mobile apparatus decrypts a message with the second authentication key, wherein the message formed by encrypting the identification number of the first mobile apparatus, the random number $r_a$ and the identification number of the access centralized control module with the second authentication key, and acquires a decrypted identification number of the first mobile apparatus, a decrypted random number $r_a$ and a decrypted identification number of the access centralized control module;

When the decrypted random number $r_a$ is consistent with the random number $r_a$ of the apparatus mutual authentication request, the second mobile apparatus determines that the first mobile apparatus corresponding to the decrypted identification number of the first mobile apparatus is a trust apparatus, namely determines that the first mobile apparatus is a legal user of the authentication server.

In step 402, when the apparatus mutual authentication request is authenticated successfully, the second mobile apparatus and the first mobile apparatus communicating with each other.

In the embodiment of the present application, when the apparatus mutual authentication request is authenticated successfully, the second mobile apparatus and the first mobile apparatus communicating with each other.

In the embodiment of the present application, the communication network system includes a plurality of mobile apparatuses, the mobile apparatuses include the first mobile apparatus and the second mobile apparatus, the second mobile apparatus stores the second authentication key; the second mobile apparatus authenticates the apparatus mutual authentication request sent by the first mobile apparatus with the second authentication key; when the apparatus mutual authentication request is authenticated successfully, the second mobile apparatus and the first mobile apparatus communicates with each other. In the embodiment of the present application, a combination of asymmetric keys and symmetric keys is used to construct and authenticate the message; further, the hash function is used to encrypt and decrypt, then achieves the construction and authentication of the authentication message with low-computation. While using one-way hash function to ensure the security of the key, and greatly reduces the amount of calculation. Only one message needs to be sent by the access control device for each authentication. At the same time, mutual authentication between mobile devices is also implemented through only two messages, which reduces communication overhead.

Figure 7:
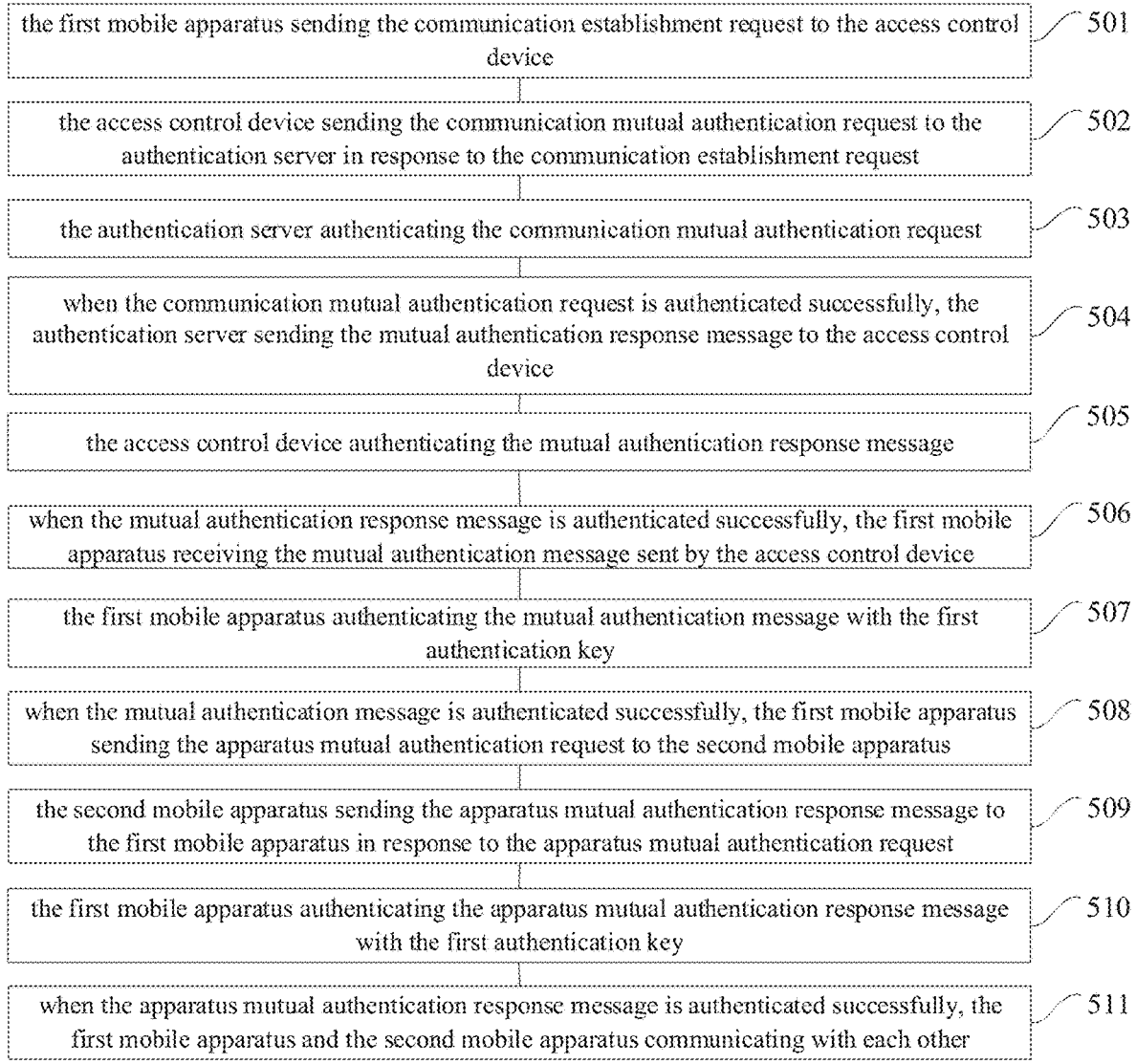
FIG. 7 is a flow chart of steps of a communication network system according to a fifth embodiment of the present application.
Figure 8:
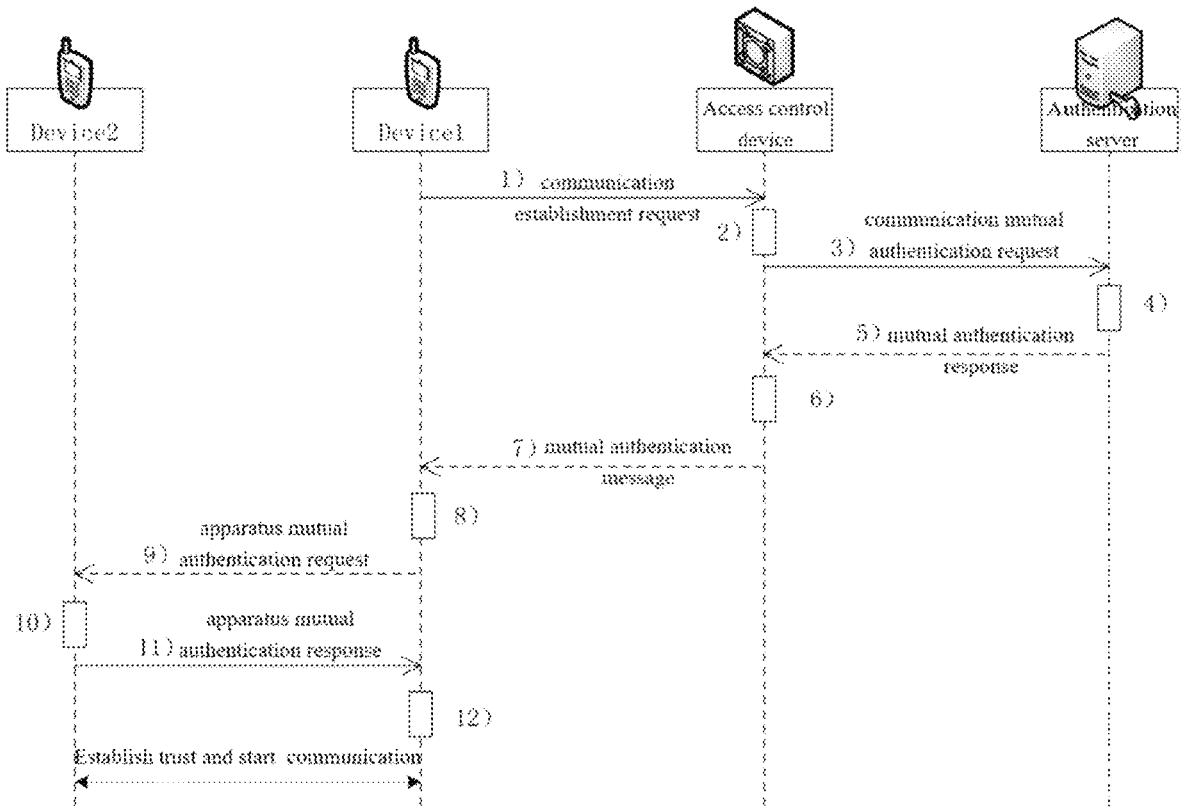
FIG. 8 is a timing diagram of a communication network system according to an embodiment of the present application.

Referring to FIG. 7, a flow chart of steps performed by the communication network system according to a fifth embodiment of the present application is illustrated, the communication network system includes the authentication server, the access control device and a plurality of mobile apparatuses, the mobile apparatuses include the first mobile apparatus and the second mobile apparatus; which may includes the following step in detail:

In step 501, the first mobile apparatus sending the communication establishment request to the access control device;

In the embodiment of the present application, the communication network system may include an authentication server, the access control device and a plurality of mobile apparatuses, the mobile apparatuses include the first mobile apparatus and the second mobile apparatus. Referring to FIG. 8, a timing diagram of a communication network system according to an embodiment of the present application is illustrated. As shown in FIG. 8, Device 1 represents the first mobile apparatus, Device 2 represents the second mobile apparatus, the first mobile apparatus sends the communication establishment request to the access control device, the access control device authenticates the communication establishment request, then sends the communication mutual authentication request to the authentication server, the remaining message transmission process is as described in steps 502 to 511.

In step 502, the access control device sending the communication mutual authentication request to the authentication server in response to the communication establishment request;

Furthermore, after the access control device authenticating the communication establishment request successfully, sends the communication mutual authentication request to the authentication server.

In step 503, the authentication server authenticating the communication mutual authentication request;

As an optional embodiment of the present application, the authentication server authenticates the communication mutual authentication request; the detailed authentication steps are not repeated here.

In step 504, when the communication mutual authentication request is authenticated successfully, the authentication server sending the mutual authentication response message to the access control device;

Optionally, when the communication mutual authentication request is authenticated successfully, the authentication server sends the mutual authentication response message to the access control device;

In step 505, the access control device authenticating the mutual authentication response message.

Practically applied to the embodiment of the present application, after the access control device receiving the mutual authentication response message, the access control device authenticates the mutual authentication response message, the detailed authentication steps are not repeated here.

In step 506, when the mutual authentication response message is authenticated successfully, the first mobile apparatus receiving the mutual authentication message sent by the access control device;

Specifically applied to the embodiment of the present application, when the mutual authentication response message is authenticated successfully, the access control device sends the mutual authentication message to the first mobile apparatus.

In step 507, the first mobile apparatus authenticating the mutual authentication message with the first authentication key;

Furthermore, after the first mobile apparatus receiving the mutual authentication message, the first mobile apparatus authenticates the mutual authentication message with the first authentication key.

In step 508, when the mutual authentication message is authenticated successfully, the first mobile apparatus sending the apparatus mutual authentication request to the second mobile apparatus;

In particular, when the first mobile apparatus authenticates the mutual authentication message successfully, the first mobile apparatus sends the apparatus mutual authentication request to the second mobile apparatus.

In step 509, the second mobile apparatus sending the apparatus mutual authentication response message to the first mobile apparatus in response to the apparatus mutual authentication request;

As an optional embodiment of the present application, the second mobile apparatus authenticates the apparatus mutual authentication request, when it is authenticated successfully, the second mobile apparatus sends the apparatus mutual authentication response message to the first mobile apparatus.

In step 510, the first mobile apparatus authenticating the apparatus mutual authentication response message with the first authentication key;

Further, the first mobile apparatus authenticates the apparatus mutual authentication response message with the first authentication key, then determines the second mobile apparatus is a trust apparatus.

In step 511, when the apparatus mutual authentication response message is authenticated successfully, the first mobile apparatus and the second mobile apparatus communicating with each other.

As a specific embodiment of the present application, when the apparatus mutual authentication response message is authenticated successfully, the first mobile apparatus and the second mobile apparatus communicate with each other.

In the embodiment of the present application, the communication network system includes the authentication server, the access control device and a plurality of mobile apparatuses, the mobile apparatuses include the first mobile apparatus and the second mobile apparatus; the first mobile apparatus sends the communication establishment request to the access control device; the access control device sends the communication mutual authentication request to the authentication server in response to the communication establishment request; the authentication server authenticates the communication mutual authentication request; when the communication mutual authentication request is authenticated successfully, the authentication server sends the mutual authentication response message to the access control device; the access control device authenticates the mutual authentication response message; when the mutual authentication response message is authenticated successfully, the first mobile apparatus receives the mutual authentication message sent by the access control device; the first mobile apparatus authenticates the mutual authentication message with the first authentication key; when the mutual authentication message is authenticated successfully, the first mobile apparatus sends the apparatus mutual authentication request to the second mobile apparatus; the second mobile apparatus sends the apparatus mutual authentication response message to the first mobile apparatus in response to the apparatus mutual authentication request; the first mobile apparatus authenticates the apparatus mutual authentication response message with the first authentication key; when the apparatus mutual authentication response message is authenticated successfully, the first mobile apparatus and the second mobile apparatus communicate with each other.

In the embodiment of the present application, the access control device and the authentication server work together to complete the mutual authentication of the mobile apparatuses in D2D communication, and the hash chain mechanism and the access control device are used to cooperate with the authentication server to implement the distribution and decentralization of the authentication function. Which can reduce the load of the authentication server and improve the efficiency of authentication. Moreover, the combination of asymmetric keys and symmetric keys is used to construct and authenticate messages; further, the hash function is used to encrypt and decrypt, which can achieve the construction of the authentication message with low-computation. In addition, the hash chain mechanism is introduced to construct the authentication key sequence, while using one-way hash function to ensure the security of the key, the calculation amount is greatly reduced.

It should be noted that, for simplicity of description, the method embodiments are expressed as a series of action combinations, but those skilled in the art should know that the embodiments of the present application are not limited by the sequence of actions described because According to the embodiments of the present application, some steps may be performed in other orders or simultaneously. Secondly, those skilled in the art should also know that the embodiments described in the specification are all preferred embodiments, and the involved actions are not necessarily required by the embodiments of the present application.

Figure 9:
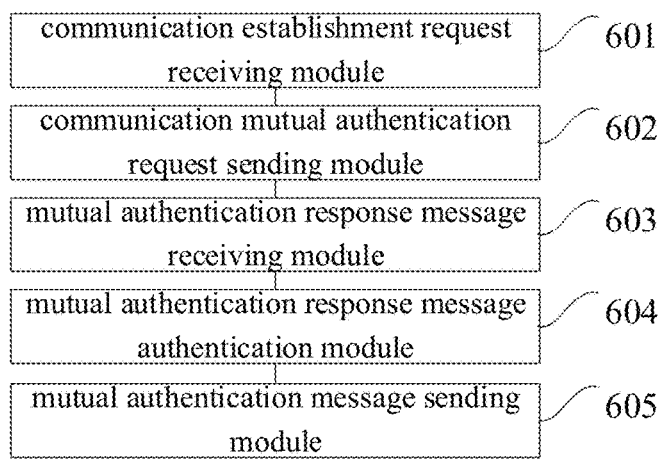
FIG. 9 is a structure diagram of an access control device according to an embodiment of the present application.

Referring to FIG. 9, a structure diagram of the access control device according to an embodiment of the present application is illustrated, which is applied to the communication network system. The communication network system includes the authentication server, the access control device and a plurality of mobile apparatuses, the mobile apparatuses include the first mobile apparatus and the second mobile apparatus, the access control device may include the following modules in detail:

a communication establishment request receiving module 601, configured for the access control device to receive the communication establishment request sent by the first mobile apparatus;

a communication mutual authentication request sending module 602, configured for the access control device to send the communication mutual authentication request to the authentication server in response to the communication establishment request;

a mutual authentication response message receiving module 603, configured for the access control device to receive the mutual authentication response message sent by the authentication server in response to the communication mutual authentication request;

a mutual authentication response message authentication module 604, configured for the access control device to authenticate the mutual authentication response message;

a mutual authentication message sending module 605, when the mutual authentication response message is authenticated successfully, configured for the access control device to send the mutual authentication message to the first mobile apparatus.

Optionally, the mutual authentication response message includes the first initial authentication key encrypted by the public key of the access control device, the second initial authentication key encrypted by the public key of the access control device, the identification number of the authentication server, the random number $r_s$, the message sequence number and the first message authentication information; wherein the first authentication information includes the first characteristic hash value and the first digital signature formed by encrypting the first characteristic hash value with a private key of the authentication server; the first characteristic hash value is obtained by hashing the input of the first initial authentication key, the second initial authentication key, the identification number of the authentication server, the random number $r_s$ and the message sequence number;

the mutual authentication response message authentication module 604 includes:

a first digital signature authentication submodule, configured for the access control device to authenticate the first digital signature of the first message authentication information with the public key of the authentication server;

a first initial authentication key acquisition submodule, when the first message authentication information is authenticated successfully, configured for the access control device to decrypt the first initial authentication key with the private key, and acquiring the decrypted first initial authentication key;

a second initial authentication key acquisition submodule, configured for the access control device to decrypt the second initial authentication key with the private key, and acquiring the decrypted second initial authentication key;

a second characteristic hash value acquisition submodule, configured for the access control device to calculate hash value obtained by hashing the input of the decrypted first initial authentication key, the decrypted second initial authentication key, the identification number of the authentication server, the random number $r_s$ and the message sequence number, and acquiring the second characteristic hash value;

a first judgment submodule, configured for the access control device to determine whether the first characteristic hash value is consistent with the second characteristic hash value;

a first determination submodule, when the first characteristic hash value is consistent with the second characteristic hash value, configured for the access control device to determine that the mutual authentication response message is authenticated successfully.

Figure 10:
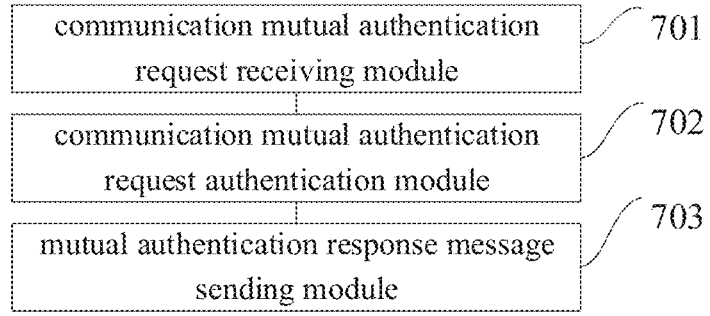
FIG. 10 is a structure diagram of an authentication server according to an embodiment of the present application.

Referring to FIG. 10, a structure diagram of the authentication server according to an embodiment of the present application is illustrated, which is applied to the communication network system, the communication network system includes the authentication server and the access control device, the authentication server may include the following modules in detail:

a communication mutual authentication request receiving module 701, configured for the authentication server to receive the communication mutual authentication request sent by the access control device;

a communication mutual authentication request authentication module 702, configured for the authentication server to authenticate the communication mutual authentication request;

a mutual authentication response message sending module 703, when the communication mutual authentication request is authenticated successfully, configured for the authentication server to send the mutual authentication response message to the access control device.

Optionally, the communication mutual authentication request includes the sequence number of the first mobile apparatus, the sequence number of the second mobile apparatus, the message sequence number, the identification number of the access control device and the second message authentication information; the second message authentication information includes the third characteristic hash value and the second digital signature formed by encrypting the third characteristic hash value with the private key of the access control device; the third characteristic hash value is obtained by hashing the input of the sequence number of the first mobile apparatus, the sequence number of the second mobile apparatus, the message sequence number and the identification number of the access control device;

the communication mutual authentication request authentication module 702 includes:

a second digital signature authentication submodule, configured for the authentication server to authenticate the second digital signature of the second message authentication information with the public key of the access control device;

a fourth characteristic hash value acquisition submodule, when the second message authentication information is authenticated successfully, configured for the authentication server to calculate hash value obtained by hashing the sequence number of the first mobile apparatus, the sequence number of the second mobile apparatus, the message sequence number and the identification number of the access control device, and acquiring the fourth characteristic hash value;

a second judgment submodule, configured for the authentication server to determine whether the third characteristic hash value is consistent with the fourth characteristic hash value;

a second determination submodule, when the third characteristic hash value is consistent with the fourth characteristic hash value, configured for the authentication server to determine that the communication mutual authentication request is authenticated successfully.

Figure 11:
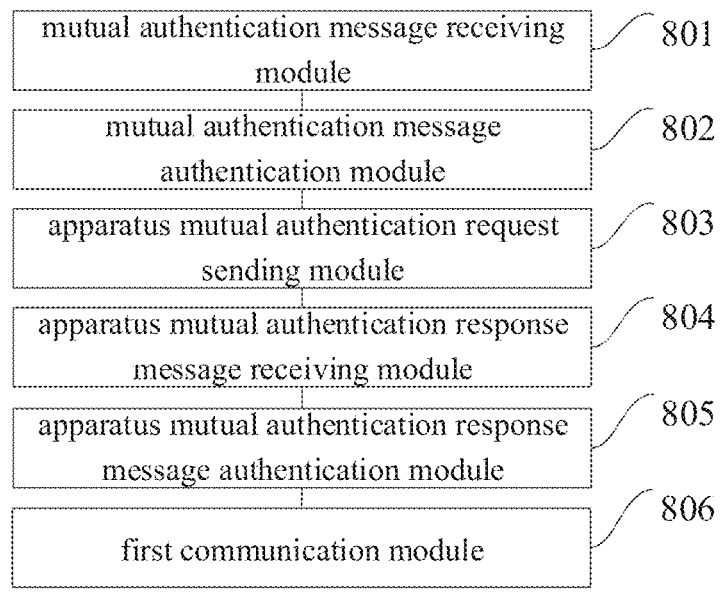
FIG. 11 is a structure diagram of a first mobile apparatus according to an embodiment of the present application.

Referring to FIG. 11, a structure diagram of the first mobile apparatus according to an embodiment of the present application is illustrated, which is applied to the communication network system, the communication network system includes the authentication server, the access control device and a plurality of mobile apparatuses, the mobile apparatuses include the first mobile apparatus and the second mobile apparatus, the first mobile apparatus stores the first authentication key; the first mobile apparatus includes the following modules:

a mutual authentication message receiving module 801, when the mutual authentication response message is authenticated successfully, configured for the first mobile apparatus to receive the mutual authentication message sent by the access control device;

a mutual authentication message authentication module 802, configured for the first mobile apparatus to authenticate the mutual authentication message with the first authentication key;

an apparatus mutual authentication request sending module 803, when the mutual authentication message is authenticated successfully, configured for the first mobile apparatus to send the apparatus mutual authentication request to the second mobile apparatus;

an apparatus mutual authentication response message receiving module 804, configured for the first mobile apparatus to receive the apparatus mutual authentication response message sent by the second mobile apparatus in response to the apparatus mutual authentication request;

an apparatus mutual authentication response message authentication module 805, configured for the first mobile apparatus to authenticate the apparatus mutual authentication response message with the first authentication key;

a first communication module 806, when the apparatus mutual authentication response message is authenticated successfully, configured for the first mobile apparatus and the second mobile apparatus to communicate with each other.

Optionally, the mutual authentication message includes the message formed by encrypting the second authentication key and the random number $r_a$ with the first authentication key, the message formed by encrypting the first authentication key and the random number $r_a$ with the second authentication key, the random number $r_a$, the random number $r_s$, the identification number of an access centralized control module, the message sequence number and the third message authentication information; wherein, the third message authentication information includes the message formed by encrypting the fifth characteristic hash value with the first authentication key; the fifth characteristic hash value is obtained by hashing the input of the message formed by encrypting the second authentication key and the random number $r_a$ with the first authentication key, the message formed by encrypting the first authentication key and the random number $r_a$ with the second authentication key, the random number $r_a$, the random number $r_s$, the identification number of the access centralized control module and the message sequence number;

the mutual authentication message authentication module 802 includes:

a sixth characteristic hash value calculation submodule, configured for the first mobile apparatus to calculate the sixth characteristic hash value obtained by hashing the input of the message formed by encrypting the second authentication key and the random number $r_a$ with the first authentication key, the message formed by encrypting the first authentication key and the random number $r_a$ with the second authentication key, the random number $r_a$, the random number $r_s$, the identification number of the access centralized control module and the message sequence number;

a fifth characteristic hash value acquisition submodule, configured for the first mobile apparatus to decrypt the third message authentication information with the first authentication key, and acquiring the decrypted fifth characteristic hash value;

a third judgment submodule, configured for the first mobile apparatus to determine whether the decrypted fifth characteristic hash value is consistent with the sixth characteristic hash value;

a second authentication key and random number $r_a$ acquisition submodule, when the decrypted fifth characteristic hash value is consistent with the sixth characteristic hash value, configured for the first mobile apparatus to decrypt the message with the first authentication key, wherein the message formed by encrypting the second authentication key and the random number $r_a$ with the first authentication key, and acquiring the decrypted second authentication key and the decrypted random number $r_a$;

a third determination submodule, when the decrypted random number $r_a$ is consistent with the random number $r_a$ of the mutual authentication message, configured for the first mobile apparatus to determine that the mutual authentication message is authenticated successfully.

Optionally, the apparatus mutual authentication response message includes the message formed by encrypting the identification number of the second mobile apparatus, the random number $r_a$ and the identification number of the access centralized control module with the first authentication key, the message sequence number and the fourth message authentication information; wherein, the fourth message authentication information includes the message formed by encrypting the seventh characteristic hash value with the first authentication key; the seventh characteristic hash value is obtained by hashing the input of the message formed by encrypting the identification number of the second mobile apparatus, the random number $r_a$ and the identification number of the access centralized control module with the first authentication key, and the message sequence number;

the apparatus mutual authentication response message authentication module 805 includes:

an eighth characteristic hash value acquisition submodule, configured for the first mobile apparatus to calculate the eighth characteristic hash value obtained by hashing the input of the message formed by encrypting the identification number of the second mobile apparatus, the random number $r_a$ and the identification number of the access centralized control module with the first authentication key, and the message sequence number;

a seventh characteristic hash value acquisition submodule, configured for the first mobile apparatus to decrypt the fourth message authentication information with the first authentication key, and acquiring the decrypted seventh characteristic hash value;

a fourth judgment submodule, configured for the first mobile apparatus to determine whether the decrypted seventh characteristic hash value is consistent with the eighth characteristic hash value;

a first identification number acquisition submodule, when the decrypted seventh characteristic hash value is consistent with the eighth characteristic hash value, configured for the first mobile apparatus to decrypt the message with the first authentication key, wherein the message formed by encrypting the identification number of the second mobile apparatus, the random number $r_a$ and the identification number of the access centralized control module with the first authentication key, and acquiring the decrypted identification number of the second mobile apparatus, the decrypted random number $r_a$ and the decrypted identification number of the access centralized control module;

a fourth determination submodule, when the decrypted random number $r_a$ is consistent with the random number $r_a$ of the apparatus mutual authentication response message, configured to determine that the second mobile apparatus corresponding to the decrypted identification number of the second mobile apparatus is a trust apparatus, and to determine that the apparatus mutual authentication response message is authenticated successfully.

Figure 12:
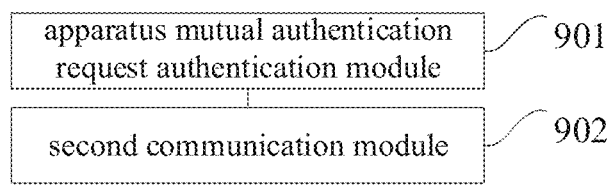
FIG. 12 is a structure diagram of a second mobile apparatus according to an embodiment of the present application.

Referring to FIG. 12, a structure diagram of a second mobile apparatus according to an embodiment of the present application is illustrated, which is applied to the communication network system, and the communication network system includes a plurality of mobile apparatuses, the mobile apparatuses include the first mobile apparatus and the second mobile apparatus, the second mobile apparatus stores the second authentication key; the second mobile apparatus includes the following modules:

an apparatus mutual authentication request authentication module 901, configured for the second mobile apparatus to authenticate the apparatus mutual authentication request sent by the first mobile apparatus with the second authentication key;

a second communication module 902, when the apparatus mutual authentication request is authenticated successfully, configured for the second mobile apparatus and the first mobile apparatus to communicate with each other.

Optionally, the apparatus mutual authentication request includes the message formed by encrypting the identification number of the first mobile apparatus, the random number $r_a$ and the identification number of the access centralized control module with the second authentication key, the message formed by encrypting the first authentication key and the random number $r_a$ with the second authentication key, the random number $r_a$, the random number $r_s$, the identification number of the access centralized control module, the message sequence number and the fifth message authentication information; wherein, the fifth message authentication information includes the message formed by encrypting the ninth characteristic hash value with the second authentication key; the ninth characteristic hash value is obtained by hashing the input of the message formed by encrypting the identification number of the first mobile apparatus, the random number $r_a$ and the identification number of the access centralized control module with the second authentication key, the message formed by encrypting the first authentication key and the random number $r_a$ with the second authentication key, the random number $r_a$, the random number $r_s$, the identification number of the access centralized control module and the message sequence number;

the apparatus mutual authentication request authentication module 901 includes:

a tenth characteristic hash value calculation submodule, configured for the second mobile apparatus to calculate the tenth characteristic hash value obtained by hashing the input of the message formed by encrypting the identification number of the first mobile apparatus, the random number $r_a$ and the identification number of the access centralized control module with the second authentication key, the message formed by encrypting the first authentication key and the random number $r_a$ with the second authentication key, the random number $r_a$, the random number $r_s$, the identification number of the access centralized control module and the message sequence number;

a ninth characteristic hash value acquisition submodule, configured for the second mobile apparatus to decrypt the fifth message authentication information with the second authentication key, and acquiring the decrypted ninth characteristic hash value;

a fifth judgment submodule, configured for the second mobile apparatus to determine whether the decrypted ninth characteristic hash value is consistent with the tenth characteristic hash value;

a first authentication key and random number $r_a$ acquisition submodule, when the decrypted ninth characteristic hash value is consistent with the tenth characteristic hash value, configured for the second mobile apparatus to decrypt the message with the second authentication key, wherein the message formed by encrypting the first authentication key and the random number $r_a$ with the second authentication key, and acquiring the decrypted first authentication key and the decrypted random number $r_a$;

a fifth determination submodule, when the decrypted random number $r_a$ is consistent with the random number $r_a$ of the apparatus mutual authentication request, configured for the second mobile apparatus to determine that the apparatus mutual authentication request is authenticated successfully.

Optionally, the second mobile apparatus further includes:

a second identification number acquisition module, configured for the second mobile apparatus to decrypt the message with the second authentication key, wherein the message formed by encrypting the identification number of the first mobile apparatus, the random number $r_a$ and the identification number of the access centralized control module with the second authentication key, and acquiring the decrypted identification number of the first mobile apparatus, the decrypted random number $r_a$ and the decrypted identification number of the access centralized control module;

a sixth determination module, when the decrypted random number $r_a$ is consistent with the random number $r_a$ of the apparatus mutual authentication request, configured for the second mobile apparatus to determine that the first mobile apparatus corresponding to the decrypted identification number of the first mobile apparatus is a trust apparatus.

Optionally, the second mobile apparatus further includes:
a first initial authentication key calculation module, configured to calculate the first initial authentication key according to the first root key and the random number $r_s$; and/or,
a second initial authentication key calculation module, configured to calculate the second initial authentication key according to the second root key and the random number $r_s$.

Optionally, the second mobile apparatus further includes:
a first authentication key sequence generation module, configured to generate the first authentication key sequence according to the first initial authentication key and the random number $r_a$;
a first authentication key extraction module, configured to extract the first authentication key from the first authentication key sequence.

Optionally, the second mobile apparatus further includes:
a second authentication key sequence generation module, configured to generate the second authentication key sequence according to the second initial authentication key and the random number $r_a$;
a second authentication key extraction module, configured to extract the second authentication key from the second authentication key sequence.

Figure 13:
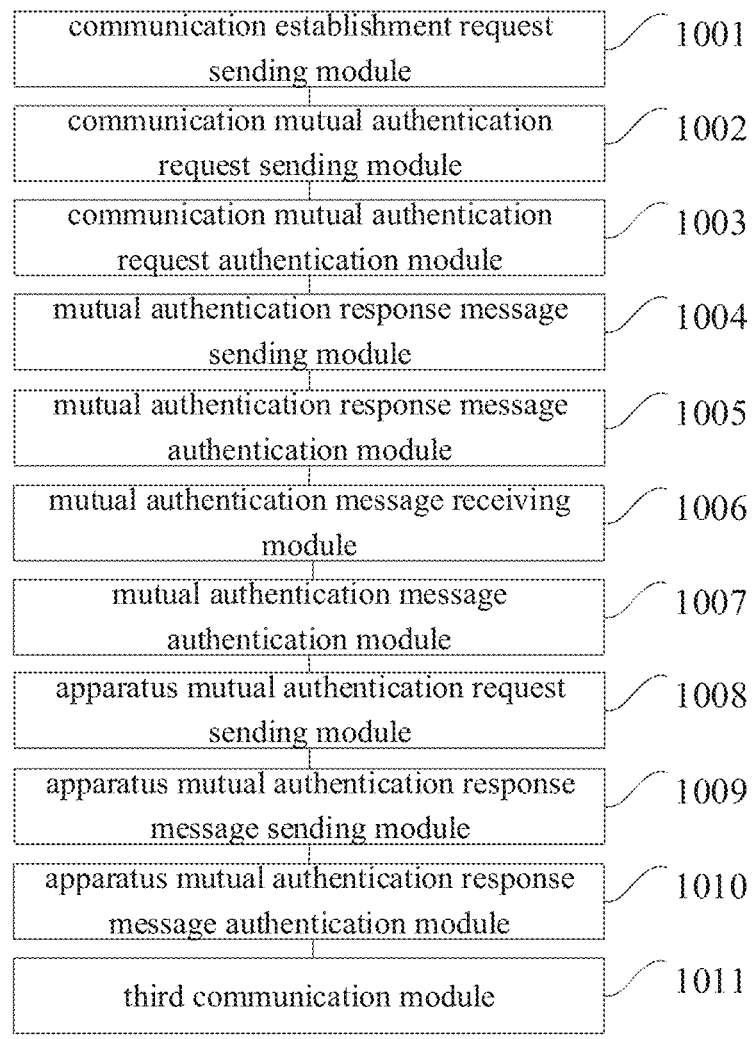
FIG. 13 is a structure diagram of a communication network system according to an embodiment of the present application.

Referring to FIG. 13, a structure diagram of the communication network system according to an embodiment of the present application is illustrated. The communication network system includes the authentication server, the access control device and a plurality of mobile apparatuses, the mobile apparatuses include the first mobile apparatus and the second mobile apparatus; the communication network system includes the following modules:

the communication establishment request sending module 1001, configured for the first mobile apparatus to send the communication establishment request to the access control device;

the communication mutual authentication request sending module 1002, configured for the access control device to send the communication mutual authentication request to the authentication server in response to the communication establishment request;

the communication mutual authentication request authentication module 1003 configured for the authentication server to authenticate the communication mutual authentication request;

the mutual authentication response message sending module 1004, when the communication mutual authentication request is authenticated successfully, configured for the authentication server to send the mutual authentication response message to the access control device;

the mutual authentication response message authentication module 1005, configured for the access control device to authenticate the mutual authentication response message;

the mutual authentication message receiving module 1006, when the mutual authentication response message is authenticated successfully, configured for the first mobile apparatus to receive the mutual authentication message sent by the access control device;

the mutual authentication message authentication module 1007, configured for the first mobile apparatus to authenticate the mutual authentication message with the first authentication key;

the apparatus mutual authentication request sending module 1008, when the mutual authentication message is authenticated successfully, configured for the first mobile apparatus sending the apparatus mutual authentication request to the second mobile apparatus;

the apparatus mutual authentication response message sending module 1009, configured for the second mobile apparatus to send the apparatus mutual authentication response message to the first mobile apparatus in response to the apparatus mutual authentication request;

the apparatus mutual authentication response message authentication module 1010, configured for the first mobile apparatus to authenticate the apparatus mutual authentication response message with the first authentication key;

a third communication module 1011, when the apparatus mutual authentication response message is authenticated successfully, configured for the first mobile apparatus and the second mobile apparatus to communicate with each other.

As for the device embodiments, since they are basically similar to the method embodiments, so the description is relatively simple. For the related parts, refer to the description of the method embodiments.

It should be noted that, the embodiments in the present disclosure are disclosed progressively, each embodiment mainly emphasis the differences from other embodiments, the similar part between different embodiments may be referred to each other.

Figure 14:
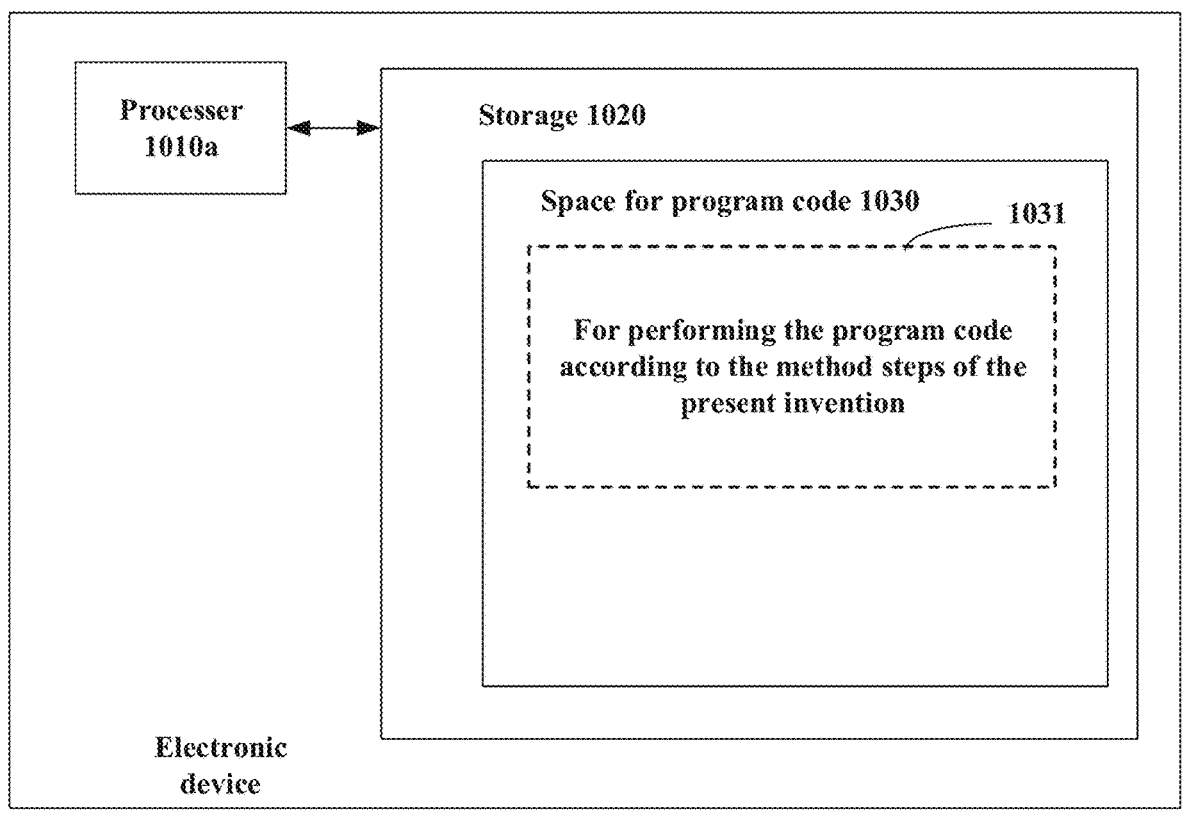
FIG. 14 is a flow diagram of an electronic device for performing the method according to an embodiment of the present application.
Figure 15:
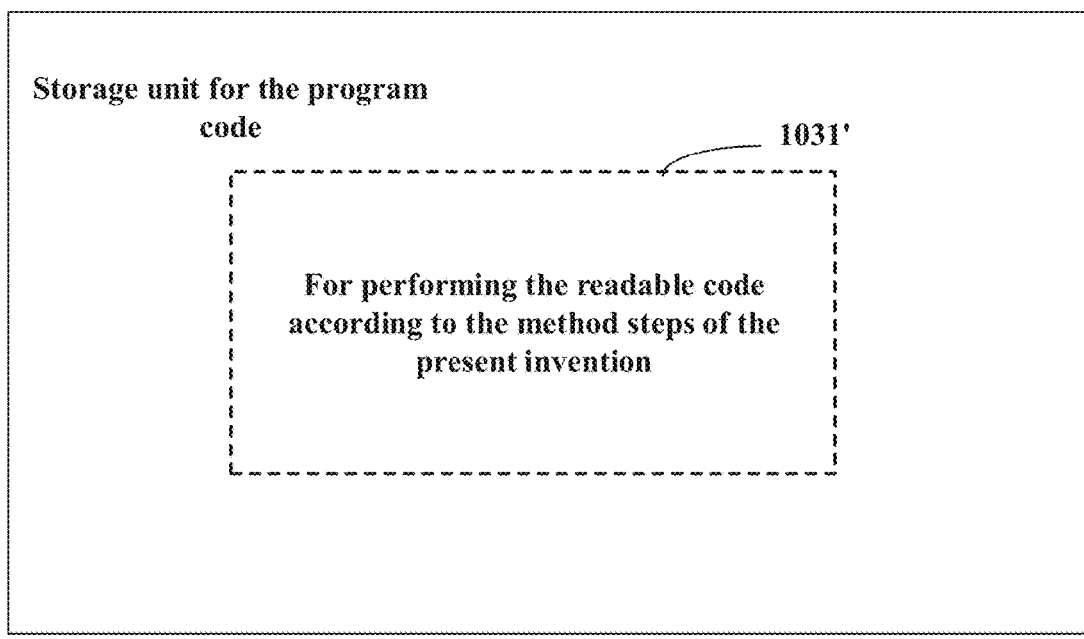
FIG. 15 is a storage unit for holding or carrying a program code implementing the method according to an embodiment of the application.

For example, FIG. 14 illustrates a block diagram of an electronic apparatus for executing the method according the disclosure. Traditionally, the electronic apparatus includes a processor 1010a and a computer program product or a computer readable medium in form of a memory 1020. The memory 1020 could be electronic memories such as flash memory, EEPROM (Electrically Erasable Programmable Read-Only Memory), EPROM, hard disk or ROM. The memory 1020 has a memory space 1030 for executing program codes 1031 of any steps in the above methods. For example, the memory space 1030 for program codes may include respective program codes 1031 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 15. The memory cells may be provided with memory sections, memory spaces, etc., similar to the memory 1020 of the server as shown in FIG. 14. The program codes may be compressed for example in an appropriate form. Usually, the memory cell includes computer readable codes 1031' which can be read for example by processors 1010a. When these codes are operated on the server, the server may execute respective steps in the method as described above.

Although the present disclosure is illustrated referring to embodiments, a skilled person in the art should understand, he or she may still modify the technical solution of the embodiments, or have replacement or modification to part or all the technical features. The replacement or modification does not vary from the core concept of the present disclosure.

At last, it should be noted that, in the present disclosure, the relational terms such as the first and the second are merely used to separate one entity from another entity, rather than requiring or implying practical relation or sequence of these entities and procedures. In addition, the term comprise or include or variant forms thereof represents the is of including but not limiting, thusly the process, method, product or apparatus which includes essentials may not only include those essentials, but also include other essentials which are not listed definitely, or may include the initial essentials of the process, method, product or apparatus. In the case that no more limitation is given, the essentials limited by the term "including" does not preclude other same or similar essentials exist in the process, method, product or apparatus.

What is claimed is:

1. A message authentication method of a communication network system, wherein the communication network system comprises an authentication server, an access control device and a plurality of mobile apparatuses, the plurality of mobile apparatuses comprise a first mobile apparatus and a second mobile apparatus, and the message authentication method comprises:

the access control device receiving a communication establishment request sent by the first mobile apparatus;

the access control device sending a communication mutual authentication request to the authentication server in response to the communication establishment request, the access control device receiving a mutual authentication response message sent by the authentication server in response to the communication mutual authentication request;

the access control device authenticating the mutual authentication response message;

when the mutual authentication response message is authenticated successfully, the access control device sending a mutual authentication message to the first mobile apparatus; and wherein the mutual authentication response message comprises a first initial authentication key encrypted by a public key of the access control device, a second initial authentication key encrypted by the public key of the access control device, an identification number of the authentication server, a random number $r_s$, a message sequence number and a first message authentication information; wherein the first message authentication information comprises a first characteristic hash value and a first digital signature formed by encrypting the first characteristic hash value with a private key of the authentication server; the first characteristic hash value is obtained by hashing an input of the first initial authentication key, the second initial authentication key, the identification number of the authentication server, the random number $r_s$ and the message sequence number, the step of the access control device authenticating the mutual authentication response message comprises:

the access control device authenticating the first digital signature of the first message authentication information with a public key of the authentication server;

when the first message authentication information is authenticated successfully, the access control device decrypting the first initial authentication key encrypted by the public key of the access control device with a private key, and acquiring a decrypted first initial authentication key;

the access control device decrypting the second initial authentication key encrypted by the public key of the access control device with the private key, and acquiring a decrypted second initial authentication key;

the access control device calculating hash value obtained by hashing an input of the decrypted first initial authentication key, the decrypted second initial authentication key, the identification number of the authentication server, the random number $r_s$ and the message sequence number, and acquiring a second characteristic hash value, the access control device determining whether the first characteristic hash value is consistent with the second characteristic hash value;

when the first characteristic hash value is consistent with the second characteristic hash value, the access control device determining that the mutual authentication response message is authenticated successfully.

2. The message authentication method according to claim 1 further comprising:

calculating the first initial authentication key according to a first root key and the random number $r_s$; and/or, calculating the second initial authentication key according to a second root key and the random number $r_s$.

3. The message authentication method according to claim 1, further comprising:

generating a first authentication key sequence according to the first initial authentication key and a random number $r_a$;

extracting a first authentication key from the first authentication key sequence.

4. The message authentication method according to claim 1, further comprising:

generating a second authentication key sequence according to the second initial authentication key and a random number $r_a$;

extracting a second authentication key from the second authentication key sequence.

5. An access control device, wherein, the access control device is applied to a communication network system, the communication network system comprises an authentication server, the access control device and a plurality of mobile apparatuses, the plurality of mobile apparatuses comprise a first mobile apparatus and a second mobile apparatus, and the access control device comprises:

a memory, wherein instructions are stored on the memory; and a processor configured to execute the instructions to perform the message authentication method according to claim 1.

6. The access control device according to claim 5, wherein, the mutual authentication response message comprises a first initial authentication key encrypted by a public key of the access control device, a second initial authentication key encrypted by the public key of the access control device, an identification number of the authentication server, a random number $r_s$, a message sequence number and a first message authentication information; wherein the first authentication information comprises a first characteristic hash value and a first digital signature formed by encrypting the first characteristic hash value with a private key of the authentication server; the first characteristic hash value is obtained by hashing the input of the first initial authentication key, the second initial authentication key, the identification number of the authentication server, the random number $r_s$ and the message sequence number; the message authentication further comprises:

authenticating the first digital signature of the first message authentication information with the public key of the authentication server;

when the first message authentication information is authenticated successfully, decrypting the first initial authentication key encrypted by a public key of the access control device with a private key, and acquiring a decrypted first initial authentication key;

decrypting the second initial authentication key encrypted by a public key of the access control device with the private key, and acquiring a decrypted second initial authentication key, calculating hash value obtained by hashing the input of the decrypted first initial authentication key, the decrypted second initial authentication key, the identification number of the authentication server, the random number $r_s$ and the message sequence number, and acquiring a second characteristic hash value;

determining whether the first characteristic hash value is consistent with the second characteristic hash value;

when the first characteristic hash value is consistent with the second characteristic hash value, determining that the mutual authentication response message is authenticated successfully.

7. A communication network system using the message authentication method according to claim 1, comprising an authentication server, an access control device and a plurality of mobile apparatuses, the plurality of mobile apparatuses comprise a first mobile apparatus and a second mobile apparatus; wherein, the first mobile apparatus is configured to send a communication establishment request to the access control device, the access control device is configured to send a communication mutual authentication request to the authentication server in response to the communication establishment request;

the authentication server is configured to authenticate the communication mutual authentication request;

when the communication mutual authentication request is authenticated successfully, the authentication server is further configured to send a mutual authentication response message to the access control device;

the access control device is configured to authenticate the mutual authentication response message;

when the mutual authentication response message is authenticated successfully, the first mobile apparatus is further configured to receive a mutual authentication message sent by the access control device;

the first mobile apparatus is further configured to authenticate the mutual authentication message with the first authentication key;

when the mutual authentication message is authenticated successfully, the first mobile apparatus is further configured to send an apparatus mutual authentication request to the second mobile apparatus;

the second mobile apparatus is configured to send an apparatus mutual authentication response message to the first mobile apparatus in response to the apparatus mutual authentication request;

the first mobile apparatus is further configured to authenticate the apparatus mutual authentication response message with the first authentication key;

when the apparatus mutual authentication response message is authenticated successfully, the first mobile apparatus and the second mobile apparatus are further configured to communicate with each other.

8. An electronic device, wherein the electronic device is configured to perform the method according to claim 1.

9. A non-transitory computer readable storage medium, wherein the storage medium is configured to store a computer program according to claim 8.

10. A message authentication method of a communication network system, wherein the communication network system comprises an authentication server and an access control device, and the message authentication method comprises:

the authentication server receiving a communication mutual authentication request sent by the access control device;

the authentication server authenticating the communication mutual authentication request;

when the communication mutual authentication request is authenticated successfully, the authentication server sending a mutual authentication response message to the access control device, and wherein the communication mutual authentication request comprises a sequence number of a first mobile apparatus, a sequence number of a second mobile apparatus, a message sequence number, an identification number of the access control device, and a second message authentication information; the second message authentication information comprises a third characteristic hash value and a second digital signature formed by encrypting the third characteristic hash value with a private key of the access control device; the third characteristic hash value is obtained by hashing an input of the sequence number of the first mobile apparatus, the sequence number of the second mobile apparatus, the message sequence number and the identification number of the access control device;

the step of the authentication server authenticating the communication mutual authentication request comprises;

the authentication server authenticating the second digital signature of the second message authentication information with a public key of the access control device, when the second message authentication information is authenticated successfully, the authentication server calculating hash value obtained by hashing the input of the sequence number of the first mobile apparatus, the sequence number of the second mobile apparatus, the message sequence number and the identification number of the access control device, and acquiring a fourth characteristic hash value;

the authentication server determining whether the third characteristic hash value is consistent with the fourth characteristic hash value;

when the third characteristic hash value is consistent with the fourth characteristic hash value, the authentication server determining that the communication mutual authentication request is authenticated successfully.

11. An authentication server, wherein, the authentication server is applied to a communication network system, the communication network system comprises the authentication server and an access control device, and the authentication server comprises:

a memory, wherein instructions are stored on the memory;

a processor configured to execute the instructions to perform the message authentication method according to claim 10.

12. The authentication server according to claim 11, wherein, the communication mutual authentication request comprises a sequence number of a first mobile apparatus, a sequence number of a second mobile apparatus, a message sequence number, an identification number of the access control device and a second message authentication information; the second message authentication information comprises a third characteristic hash value and a second digital signature formed by encrypting the third characteristic hash value with a private key of the access control device, the third characteristic hash value is obtained by hashing an input of the sequence number of the first mobile apparatus, the sequence number of the second mobile apparatus, the message sequence number and the identification number of the access control device; the message authentication method further comprises:
  authenticating the second digital signature of the second message authentication information with a public key of the access control device,
  when the second message authentication information is authenticated successfully, calculating hash value obtained by hashing the sequence number of the first mobile apparatus, the sequence number of the second mobile apparatus, the message sequence number and the identification number of the access control device, and acquiring a fourth characteristic hash value;
  determining whether the third characteristic hash value is consistent with the fourth characteristic hash value;
  when the third characteristic hash value is consistent with the fourth characteristic hash value, determining that the communication mutual authentication request is authenticated successfully.

13. A communication method of a communication network system, wherein, the communication network system comprises an authentication server, an access control device and a plurality of mobile apparatuses, the mobile apparatuses comprise a first mobile apparatus and a second mobile apparatus, the first mobile apparatus stores a first authentication key; and the communication method comprises:
  when a mutual authentication response message is authenticated successfully, the first mobile apparatus receiving a mutual authentication message sent by the access control device;
  the first mobile apparatus authenticating the mutual authentication message with the first authentication key;
  when the mutual authentication message is authenticated successfully, the first mobile apparatus sending an apparatus mutual authentication request to the second mobile apparatus;
  the first mobile apparatus receiving an apparatus mutual authentication response message sent by the second mobile apparatus in response to the apparatus mutual authentication request;
  the first mobile apparatus authenticating the apparatus mutual authentication response message with the first authentication key;
  when the apparatus mutual authentication response message is authenticated successfully, the first mobile apparatus and the second mobile apparatus communicating with each other, and wherein the mutual authentication message comprises a message formed by encrypting a second authentication key and a random number $r_a$ with the first authentication key, a message formed by encrypting the first authentication key and the random number $r_a$ with the second authentication key, the random number $r_a$, a random number $r_s$, an identification number of an access centralized control module, a message sequence number and a third message authentication information; wherein, the third message authentication information comprises a message formed by encrypting a fifth characteristic hash value with the first authentication key; the fifth characteristic hash value is obtained by hashing an input of the message formed by encrypting the second authentication key and the random number $r_a$ with the first authentication key, the message formed by encrypting the first authentication key and the random number $r_a$ with the second authentication key, the random number $r_a$, the random number $r_s$, the identification number of the access centralized control module and the message sequence number;
  the step of the first mobile apparatus authenticating the mutual authentication message with the first authentication key comprises;
  the first mobile apparatus calculating a sixth characteristic hash value obtained by hashing the input of the message formed by encrypting the second authentication key and the random number $r_a$ with the first authentication key, the message formed by encrypting the first authentication key and the random number $r_a$ with the second authentication key, the random number $r_a$ the random number $r_s$, the identification number of the access centralized control module and the message sequence number;
  the first mobile apparatus decrypting the third message authentication information with the first authentication key, and acquiring a decrypted fifth characteristic hash value;
  the first mobile apparatus determining whether the decrypted fifth characteristic hash value is consistent with the sixth characteristic hash value;
  when the decrypted fifth characteristic hash value is consistent with the sixth characteristic hash value, the first mobile apparatus decrypting a message with the first authentication key, wherein the message formed by encrypting the second authentication key and the random number $r_a$ with the first authentication key, and acquiring a decrypted second authentication key and a decrypted random number $r_a$;
  when the decrypted random number $r_a$ is consistent with the random number $r_a$ of the mutual authentication message, the first mobile apparatus determining that the mutual authentication message is authenticated successfully.

14. The communication method according to claim 13, wherein, the apparatus mutual authentication response message comprises a message formed by encrypting an identification number of the second mobile apparatus, a random number $r_a$ and an identification number of an access centralized control module with the first authentication key, a message sequence number and a fourth message authentication information; wherein, the fourth message authentication information comprises a message formed by encrypting a seventh characteristic hash value with the first authentication key, the seventh characteristic hash value is obtained by hashing an input of the message formed by encrypting the identification number of the second mobile apparatus, the random number $r_a$ and the identification number of the access centralized control module with the first authentication key, and the message sequence number:
  the step of the first mobile apparatus authenticating the apparatus mutual authentication response message with the first authentication key comprises:
  the first mobile apparatus calculating an eighth characteristic hash value obtained by hashing the input of the message formed by encrypting the identification number of the second mobile apparatus, the random number $r_a$ and the identification number of the access centralized control module with the first authentication key, and the message sequence number;

the first mobile apparatus decrypting the fourth message authentication information with the first authentication key, and acquiring a decrypted seventh characteristic hash value, the first mobile apparatus determining whether the decrypted seventh characteristic hash value is consistent with the eighth characteristic hash value, when the decrypted seventh characteristic hash value is consistent with the eighth characteristic hash value, the first mobile apparatus decrypting a message with the first authentication key, wherein the message formed by encrypting the identification number of the second mobile apparatus, the random number $r_a$ and the identification number of the access centralized control module with the first authentication key, and acquiring a decrypted identification number of the second mobile apparatus, a decrypted random number $r_a$ and a decrypted identification number of the access centralized control module;

when the decrypted random number $r_a$ is consistent with the random number $r_a$ of the apparatus mutual authentication response message, then determining that the second mobile apparatus corresponding to the decrypted identification number of the second mobile apparatus is a trust apparatus, and determining the apparatus mutual authentication response message is authenticated successfully.

15. A first mobile apparatus, wherein the first mobile apparatus is applied to a communication network system, the communication network system comprises an authentication server, an access control device and a plurality of mobile apparatuses, the plurality of mobile apparatuses comprise a first mobile apparatus and a second mobile apparatus, the first mobile apparatus stores a first authentication key; and the first mobile apparatus comprises:
 a memory, wherein instructions are stored on the memory;
 a processor configured to execute the instructions to perform the communication method according to claim 13.

16. The first mobile apparatus according to claim 15, wherein, the mutual authentication message comprises a message formed by encrypting a second authentication key and a random number $r_a$ with the first authentication key, a message formed by encrypting the first authentication key and the random number $r_a$ with the second authentication key, the random number $r_a$, a random number $r_s$, an identification number of an access centralized control module, a message sequence number and a third message authentication information, wherein, the third message authentication information comprises a message formed by encrypting a fifth characteristic hash value with the first authentication key; the fifth characteristic hash value is obtained by hashing an input of the message formed by encrypting the second authentication key and the random number $r_a$ with the first authentication key, the message formed by encrypting the first authentication key and the random number $r_a$ with the second authentication key, the random number $r_a$, the random number $r_s$, the identification number of the access centralized control module and the message sequence number: the communication method further comprises:
 calculating a sixth characteristic hash value obtained by hashing the input of the message formed by encrypting the second authentication key and the random number $r_a$ with the first authentication key, the message formed by encrypting the first authentication key and the random number $r_a$ with the second authentication key, the random number $r_a$, the random number $r_s$, the identification number of the access centralized control module and the message sequence number;

decrypting the third message authentication information with the first authentication key, and acquiring a decrypted fifth characteristic hash value;

determining whether the decrypted fifth characteristic hash value is consistent with the sixth characteristic hash value;

when the decrypted fifth characteristic hash value is consistent with the sixth characteristic hash value, decrypting a message with the first authentication key, wherein the message formed by encrypting the second authentication key and the random number $r_a$ with the first authentication key, and acquiring a decrypted second authentication key and a decrypted random number $r_a$;

when the decrypted random number $r_a$ is consistent with the random number $r_a$ of the mutual authentication message, determining that the mutual authentication message is authenticated successfully.

17. The first mobile apparatus according to claim 15, wherein, the apparatus mutual authentication response message comprises a message formed by encrypting an identification number of the second mobile apparatus, a random number $r_3$ and an identification number of an access centralized control module with the first authentication key, a message sequence number and a fourth message authentication information; wherein, the fourth message authentication information comprises a message formed by encrypting a seventh characteristic hash value with the first authentication key, the seventh characteristic hash value is obtained by hashing an input of the message formed by encrypting the identification number of the second mobile apparatus, the random number $r_a$ and the identification number of the access centralized control module with the first authentication key, and the message sequence number; the communication method further comprises:
 calculating an eighth characteristic hash value obtained by hashing the input of the message formed by encrypting the identification number of the second mobile apparatus, the random number $r_a$ and the identification number of the access centralized control module with the first authentication key, and the message sequence number, decrypting the fourth message authentication information with the first authentication key, and acquiring a decrypted seventh characteristic hash value;

determining whether the decrypted seventh characteristic hash value is consistent with the eighth characteristic hash value;

when the decrypted seventh characteristic hash value is consistent with the eighth characteristic hash value, decrypting a message with the first authentication key, wherein the message formed by encrypting the identification number of the second mobile apparatus, the random number $r_a$ and the identification number of the access centralized control module with the first authentication key, and acquiring a decrypted identification number of the second mobile apparatus, a decrypted random number $r_a$ and a decrypted identification number of the access centralized control module;

when the decrypted random number $r_a$ is consistent with the random number $r_a$ of the apparatus mutual authentication response message, determining that the second mobile apparatus corresponding to the decrypted identification number of the second mobile apparatus is a trust apparatus, and determining the apparatus mutual authentication response message is authenticated successfully.

\* \* \* \* \*